(12) United States Patent
Whitley et al.

(10) Patent No.: US 9,726,192 B2
(45) Date of Patent: Aug. 8, 2017

(54) FAN BLADES AND ASSOCIATED BLADE TIPS

(71) Applicant: ASSA ABLOY Entrance Systems AB, Landskrona (SE)

(72) Inventors: L. Blake Whitley, Arlington, TX (US); Richard K. Hoofard, Dallas, TX (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 308 days.

(21) Appl. No.: 14/675,392

(22) Filed: Mar. 31, 2015

(65) Prior Publication Data

US 2016/0290357 A1     Oct. 6, 2016

(51) Int. Cl.
| | |
|---|---|
| *F04D 29/38* | (2006.01) |
| *F04D 25/08* | (2006.01) |
| *B29C 44/12* | (2006.01) |
| *F04D 19/00* | (2006.01) |
| *F04D 29/32* | (2006.01) |
| *F04D 29/34* | (2006.01) |
| *B29K 75/00* | (2006.01) |
| *B29L 31/08* | (2006.01) |
| *B29K 655/02* | (2006.01) |

(52) U.S. Cl.
CPC ........ *F04D 29/388* (2013.01); *B29C 44/1271* (2013.01); *F04D 19/002* (2013.01); *F04D 25/088* (2013.01); *F04D 29/325* (2013.01); *F04D 29/34* (2013.01); *B29K 2075/00* (2013.01); *B29K 2655/02* (2013.01); *B29K 2995/0063* (2013.01); *B29L 2031/082* (2013.01); *F05D 2240/307* (2013.01); *F05D 2300/612* (2013.01)

(58) Field of Classification Search
CPC .... F04D 29/388; F04D 29/325; F04D 25/088; F04D 19/002; F05D 2240/307
See application file for complete search history.

(56) References Cited

U.S. PATENT DOCUMENTS

| | | |
|---|---|---|
| 11,629 A | 8/1854 | Halladay |
| 871,729 A | 11/1907 | McChord, Jr. |
| 1,041,913 A | 10/1912 | Tyson |
| 1,379,439 A | 5/1921 | Bott |

(Continued)

FOREIGN PATENT DOCUMENTS

| | | |
|---|---|---|
| DE | 3819145 | 12/1989 |
| EP | 1173359 | 1/2002 |

(Continued)

OTHER PUBLICATIONS

"The Intelligent Approach to Commercial / Industrial Ceiling Fans," Technical Guide, Commercial Industrial & Special Application Ceiling Fans, Leading Edge, A Marley Engineered Products Brand, Leading Edge 1999, 32 pages.

(Continued)

*Primary Examiner* — Ninh H Nguyen
(74) *Attorney, Agent, or Firm* — Perkins Coie LLP

(57) ABSTRACT

Fans having fan blades with lightweight blade tips are disclosed herein. In one embodiment, for example, each fan blade includes a blade tip attached to an end portion of a main airfoil. The blade tip includes a shaped body that is molded over a support structure to form the shape and exterior surface of the blade tip.

27 Claims, 15 Drawing Sheets

(56) References Cited

U.S. PATENT DOCUMENTS

| | | | |
|---|---|---|---|
| 1,614,186 A * | 1/1927 | Clay | B64C 11/205 416/224 |
| 2,014,032 A * | 9/1935 | Sharpe | F04D 29/384 416/228 |
| 2,952,320 A | 9/1960 | Bensen | |
| 3,524,712 A | 8/1970 | Petrie et al. | |
| 3,721,507 A | 3/1973 | Monteleone | |
| 4,093,402 A | 6/1978 | Van Holten et al. | |
| 4,174,924 A | 11/1979 | Smithson, Jr. | |
| 4,248,572 A | 2/1981 | Fradenburgh et al. | |
| 4,324,530 A | 4/1982 | Fradenburgh et al. | |
| 4,334,828 A | 6/1982 | Moffitt et al. | |
| 4,662,823 A | 5/1987 | Cooke et al. | |
| 4,722,608 A * | 2/1988 | Salzman | B01F 7/00016 366/270 |
| 4,744,728 A | 5/1988 | Lednicer et al. | |
| 4,968,216 A | 11/1990 | Anderson et al. | |
| 4,975,022 A | 12/1990 | Perry et al. | |
| 5,213,476 A * | 5/1993 | Monroe | B29C 70/443 416/230 |
| 5,226,783 A | 7/1993 | Mita et al. | |
| 5,320,494 A | 6/1994 | Reinfelder et al. | |
| 5,348,253 A | 9/1994 | Gratzer | |
| 5,564,901 A | 10/1996 | Moore et al. | |
| 5,601,409 A * | 2/1997 | Huang | F04D 25/088 416/229 R |
| 5,725,355 A | 3/1998 | Crall et al. | |
| 5,785,282 A | 7/1998 | Wake et al. | |
| 5,823,480 A | 10/1998 | La Roche | |
| 5,860,788 A | 1/1999 | Sorensen et al. | |
| 5,885,059 A | 3/1999 | Kovalsky et al. | |
| 5,927,948 A | 7/1999 | Perry et al. | |
| 5,992,793 A | 11/1999 | Perry et al. | |
| 6,039,541 A | 3/2000 | Parker et al. | |
| 6,106,235 A | 8/2000 | Tettenborn et al. | |
| 6,109,874 A * | 8/2000 | Steiner | A61L 9/122 416/229 R |
| 6,161,797 A | 12/2000 | Kirk et al. | |
| 6,244,821 B1 | 6/2001 | Boyd et al. | |
| 6,315,522 B1 | 11/2001 | Yamakawa et al. | |
| 6,334,705 B1 | 1/2002 | Weetman et al. | |
| 6,431,498 B1 | 8/2002 | Watts et al. | |
| 6,517,315 B2 | 2/2003 | Belady et al. | |
| 6,565,320 B1 | 5/2003 | Surls et al. | |
| 6,589,016 B2 | 7/2003 | Boyd et al. | |
| 6,719,533 B2 | 4/2004 | Bird | |
| 6,776,578 B2 | 8/2004 | Belady | |
| 6,817,835 B2 | 11/2004 | Boyd et al. | |
| 6,884,034 B1 | 4/2005 | Parker et al. | |
| 6,939,108 B2 | 9/2005 | Boyd | |
| 6,976,829 B2 | 12/2005 | Kovalsky et al. | |
| 7,128,536 B2 | 10/2006 | Powell et al. | |
| 7,246,998 B2 | 7/2007 | Kovalsky et al. | |
| 7,252,478 B2 | 8/2007 | Aynsley | |
| 7,284,960 B2 | 10/2007 | Aynsley | |
| D587,799 S | 3/2009 | Oleson | |
| D607,988 S | 1/2010 | Oleson et al. | |
| 7,654,798 B2 | 2/2010 | Aynsley | |
| 7,658,232 B2 | 2/2010 | Anderson et al. | |
| 7,726,945 B2 | 6/2010 | Grant et al. | |
| D631,536 S | 1/2011 | Wiegel et al. | |
| D635,237 S | 3/2011 | Fizer | |
| 7,934,907 B2 | 5/2011 | Aynsley et al. | |
| 7,955,055 B1 | 6/2011 | Boyd et al. | |
| D641,075 S | 7/2011 | Fizer et al. | |
| D642,674 S | 8/2011 | Oleson | |
| 8,066,480 B2 | 11/2011 | Madsen | |
| 8,075,273 B2 | 12/2011 | Aynsley | |
| 8,079,823 B2 | 12/2011 | Aynsley et al. | |
| D650,893 S | 12/2011 | Fizer | |
| 8,123,479 B2 | 2/2012 | Klemo et al. | |
| 8,142,156 B2 | 3/2012 | Wiegel et al. | |
| 8,147,182 B2 | 4/2012 | Aynsley et al. | |
| 8,147,204 B2 | 4/2012 | Scherer et al. | |
| 8,152,453 B2 | 4/2012 | Oleson | |
| 8,162,613 B2 * | 4/2012 | Oleson | F04D 25/088 416/210 R |
| D672,868 S | 12/2012 | Williams | |
| D676,953 S | 2/2013 | Hollan et al. | |
| D690,409 S | 9/2013 | Noble et al. | |
| 8,529,212 B2 | 9/2013 | Smith et al. | |
| D692,120 S | 10/2013 | Noble et al. | |
| 8,579,588 B1 | 11/2013 | Boyd | |
| 8,622,712 B2 | 1/2014 | Wiegel et al. | |
| 8,646,177 B2 | 2/2014 | Tirumalai et al. | |
| 8,672,649 B2 | 3/2014 | Smith et al. | |
| D705,975 S | 5/2014 | Hedstrom et al. | |
| D705,976 S | 5/2014 | Hedstrom et al. | |
| 8,721,305 B2 | 5/2014 | Oleson et al. | |
| 8,753,081 B2 | 6/2014 | Aynsley et al. | |
| 8,770,937 B2 | 7/2014 | Fizer et al. | |
| 8,770,949 B2 | 7/2014 | Noble | |
| 8,821,126 B2 | 9/2014 | Oleson et al. | |
| 8,842,000 B2 | 9/2014 | Walford et al. | |
| D717,935 S | 11/2014 | Strecker | |
| D717,936 S | 11/2014 | Peterson | |
| 8,876,468 B2 | 11/2014 | Aynsley et al. | |
| 8,900,041 B2 | 12/2014 | Toy et al. | |
| 8,956,124 B2 | 2/2015 | Boyd | |
| D723,678 S | 3/2015 | Strecker et al. | |
| 9,011,099 B2 * | 4/2015 | Wortman | F01D 5/141 416/210 R |
| D732,657 S | 6/2015 | Peterson et al. | |
| 9,192,027 B1 | 11/2015 | Pistilli | |
| 2002/0001521 A1 | 1/2002 | Boyd et al. | |
| 2002/0155807 A1 | 10/2002 | Moor et al. | |
| 2002/0182071 A1 | 12/2002 | Belady | |
| 2003/0095864 A1 | 5/2003 | Ivanovic | |
| 2003/0095874 A1 | 5/2003 | Tagami | |
| 2004/0063571 A1 | 4/2004 | Kim et al. | |
| 2004/0084544 A1 | 5/2004 | Boyd et al. | |
| 2004/0131470 A1 | 7/2004 | Boyd | |
| 2006/0104812 A1 | 5/2006 | Kovalsky et al. | |
| 2006/0187750 A1 | 8/2006 | Aldrich et al. | |
| 2008/0008596 A1 | 1/2008 | Aynsley | |
| 2008/0014090 A1 | 1/2008 | Aynsley et al. | |
| 2008/0014092 A1 | 1/2008 | Aynsley | |
| 2008/0193294 A1 | 8/2008 | Grant et al. | |
| 2008/0213097 A1 | 9/2008 | Oleson et al. | |
| 2009/0072108 A1 | 3/2009 | Oleson | |
| 2009/0081045 A1 | 3/2009 | Scherer et al. | |
| 2009/0097975 A1 | 4/2009 | Aynsley et al. | |
| 2009/0162197 A1 | 6/2009 | Klemo et al. | |
| 2009/0178815 A1 | 7/2009 | Anderson et al. | |
| 2009/0208333 A1 | 8/2009 | Smith et al. | |
| 2009/0253364 A1 | 10/2009 | Henry | |
| 2010/0034651 A1 | 2/2010 | Wiegel et al. | |
| 2010/0034664 A1 | 2/2010 | Wiegel et al. | |
| 2010/0104445 A1 | 4/2010 | Aynsley | |
| 2010/0104461 A1 | 4/2010 | Smith et al. | |
| 2010/0247316 A1 | 9/2010 | Aynsley et al. | |
| 2010/0278637 A1 | 11/2010 | Oleson et al. | |
| 2010/0291858 A1 | 11/2010 | Toy | |
| 2011/0081246 A1 | 4/2011 | Aynsley et al. | |
| 2011/0156002 A1 | 6/2011 | Leatherdale et al. | |
| 2011/0262278 A1 | 10/2011 | Fizer et al. | |
| 2012/0128501 A1 | 5/2012 | Hoofard et al. | |
| 2012/0177500 A1 | 7/2012 | Oleson et al. | |
| 2012/0177509 A1 | 7/2012 | Aynsley et al. | |
| 2013/0189104 A1 | 7/2013 | Hollan et al. | |
| 2013/0189109 A1 | 7/2013 | Noble | |
| 2013/0251522 A1 | 9/2013 | Oleson | |
| 2014/0023507 A1 | 1/2014 | Smith et al. | |
| 2014/0072431 A1 | 3/2014 | Smith et al. | |
| 2014/0093385 A1 | 4/2014 | Boyd et al. | |
| 2014/0286779 A1 | 9/2014 | Aynsley et al. | |
| 2014/0348649 A1 | 11/2014 | Oleson | |
| 2015/0023802 A1 | 1/2015 | Oleson et al. | |
| 2015/0037164 A1 | 2/2015 | Fizer et al. | |
| 2015/0078902 A1 | 3/2015 | Fizer et al. | |
| 2015/0086383 A1 | 3/2015 | Toy | |

(56) References Cited

U.S. PATENT DOCUMENTS

| | | |
|---|---|---|
| 2015/0147188 A1 | 5/2015 | Danielsson |
| 2015/0211532 A1 | 7/2015 | Whitley |
| 2015/0260199 A1 | 9/2015 | Hollan |

FOREIGN PATENT DOCUMENTS

| | | | |
|---|---|---|---|
| EP | 1619391 | | 1/2006 |
| EP | 2271408 | | 1/2011 |
| EP | 2397783 | A1 | 12/2011 |
| GB | 100134 | | 3/1917 |
| GB | 946794 | | 1/1964 |
| GB | 2050530 | | 1/1981 |
| GB | 2198190 | | 6/1988 |
| WO | 0049342 | | 8/2000 |
| WO | 2006022812 | | 3/2006 |
| WO | 2008097735 | | 8/2008 |
| WO | 2009011933 | | 1/2009 |
| WO | 2009038988 | | 3/2009 |
| WO | 2009049052 | | 4/2009 |
| WO | 2009091443 | | 7/2009 |
| WO | 2010019472 | | 2/2010 |
| WO | 2011041220 | | 4/2011 |
| WO | 2011133419 | | 10/2011 |
| WO | 2011138626 | | 11/2011 |
| WO | 2013109711 | | 7/2013 |
| WO | 2013112721 | | 8/2013 |
| WO | 2014070747 | | 5/2014 |
| WO | 2014071046 | | 5/2014 |
| WO | 2014190285 | | 11/2014 |
| WO | 2015031322 | | 3/2015 |
| WO | 2015142871 | | 9/2015 |
| WO | 2015153604 | | 10/2015 |
| WO | 2015168127 | | 11/2015 |

OTHER PUBLICATIONS 747-400, Screenshot from http://www.boeing.com/commercial/747family/pf/pf_exterior.html; printed on Jul. 30, 2012, 1 page.
Advanced Blended Winglets, page last updated Feb. 6, 2004, The 737 Information Site, http://www.b7s7.org.uk Chris Brady 1999, 9 pages.
Airmotion Sciences, Inc., AirMotion™ AltAir™ eBrochure, 2010, 20 pages.
Airmotion Sciences, Inc., AirMotion™ Big Smart Fans™ 12-ft, Specifications Sheet, 2012, 1 page.
Airmotion Sciences, Inc., AirMotion™ Big Smart Fans™ 15-ft, Specifications Sheet, 2012, 1 page.
Airmotion Sciences, Inc., AirMotion™ Big Smart Fans™ 9-ft, Specifications Sheet, 2012, 1 page.
Airmotion Sciences, Inc., AirMotion™ Big Smart Fans™ for Agricultural Facilities, flyer, 2 pages.
Airmotion Sciences, Inc., What Is Heat DeStratification, and How AirMotion™ Big Smart Fans™ Help Reduce Heating costs, 2010, 1 page.
AirMotion™ AltAir™ The next Generation High volume—Low Speed (HVLS) Fans, User Manual, © AirMotion Sciencies, Inc. 2010, 10 pages.
Big Ass Fans Installation Guide Powerfoil X, Oct. 2009, 2 pages.
Boeing 747-400 Twin-Aisle Jet Airliner, USA Screenshot from http://www.aerospacetechnology.com/projects/747/7473.html, printed on Jul. 30, 2012, 1 page.
Dairy Notes; University of California Cooperative Extension (May 1999), 5 pages.
Fairbank, "A Large Paddle Fan for Livestock Cooling" American Society of Agricultural Engineers, Jun. 1989, 16 pages.
Fan Brochure, Rite-Hite Fans, HVLS FANS, Date PDF Created: Aug. 31, 2010; 12 pages.
General Exterior Arrangement 737, Screenshot from http://www.boeing.com/commercial/737family/pf/pf_exterior.html, printed on Jul. 30, 2012, 1 page.
Image: Winglet and nav light arp.jpg, Screenshot from http://en.wikipedia.org/wiki/Image:Winglet_and_nav_light_arp.jpg; printed on Aug. 11, 2008.
Jain et al., "Experimental Investigation of the Flow Field of a Ceiling Fan," ASME Heat Transfer/Fluids Engineering Summer Conference, Paper No. HT-FED-2004-56226 (Jul. 2004) Abstract Only, 1 page.
KC-135A in flight—closeup of winglet with attached tufts, Screenshot from http://www.dfrc.nasa.gov/gallery/Photo/KC-135/Small/EC79-11481.jpg; Dated: 1979, 1 page.
KC-135A in flight-winglet study, EC79-11314, Screenshot from http://www.dfrc.nasa.gov/gallery/Photo/KC-135/Small/EC79-11314; Dated: 1979, 1 page.
KC-135A in flight-winglet study, EC79-11484, Screenshot from http://www.dfrc.nasa.gov/gallery/Photo/KC-135/Small/EC79-11484; Dated: 1979, 1 page.
Montoya, L.C.; KC-135 Winglet Flight Results, NASA Dryden Flight Research Center, pp. 145-156, 12 pages.
NASA Dryden Technology Facts-Winglets, Screenshot from http://www.nasa.gov/centers/dryden/about/Organizations/Technology/Facts/TF-2004-15-D; printed on Jul. 30, 2012, 1 page.
Next-Generation 737 Production Winglets, © Boeing, Jun. 5, 2004 snapshot of http://www.boeing.com/commercial/737family/pf/pf_winglets.html through waybackmachine Internet Archive.
Rite Hite Fan Commander Touch Screen; Date PDF created: Aug. 27, 2010; 2 pages.
Rite Hite Fans Revolution Installation and Owner's Manual, Jul. 2010, 2 pages.
Screenshots from www.b737.org.uk, relating to winglets, printed Jul. 2012, 11 pages.
U.S. Appl. No. 60/892,339, filed Mar. 1, 2007, 8 pages.
U.S. Appl. No. 60/972,890, filed Sep. 17, 2007, 8 pages.
U.S. Appl. No. 60/975,230, filed Sep. 26, 2007, 11 pages.
U.S. Appl. No. 60/978,860, filed Oct. 10, 2007, 15 pages.
Winglet Detail; screenshot from http://upload.wikimedia.org/wikipedia/commons/5/53/Wingletdetail.jpg; printed on Aug. 11, 2008.
Wingtip Device; screenshot from http://en.wikipedia.org/wiki/Wingtip_device; printed on Aug. 11, 2008.

* cited by examiner

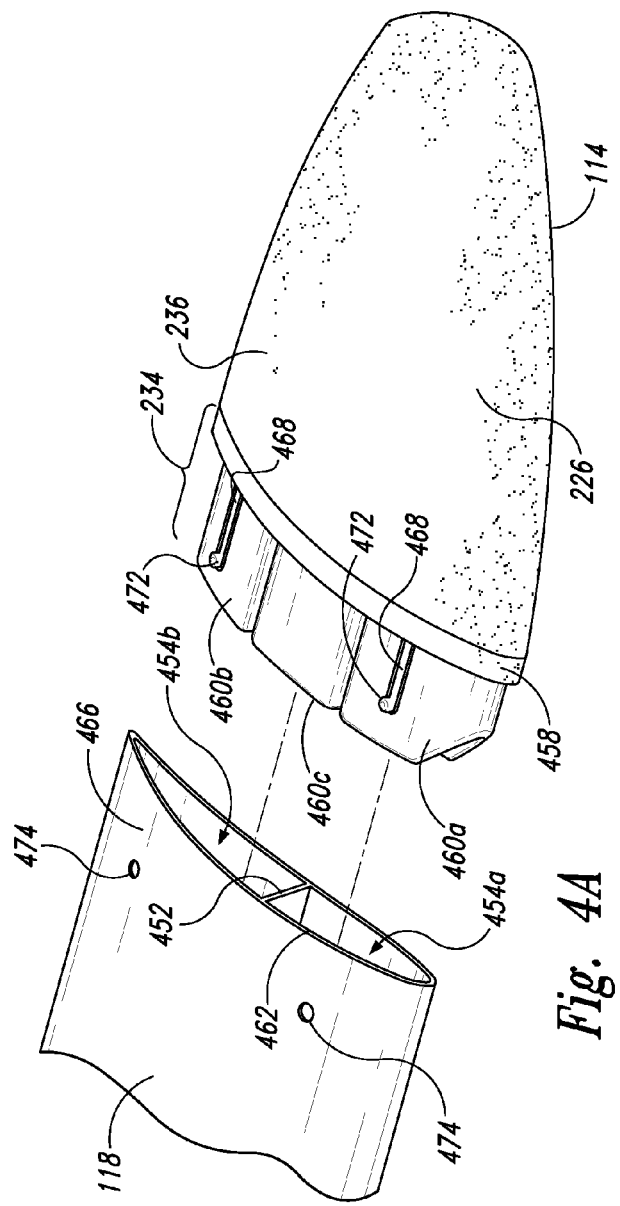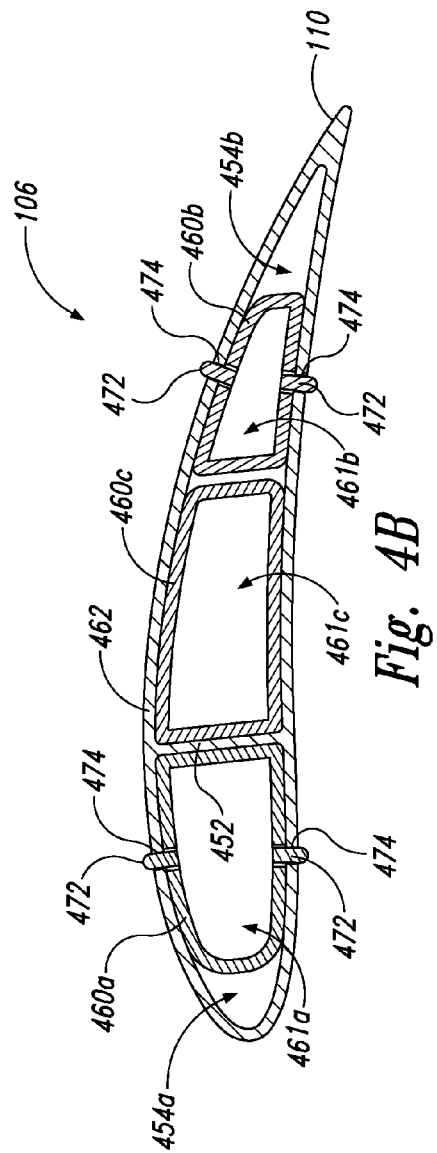

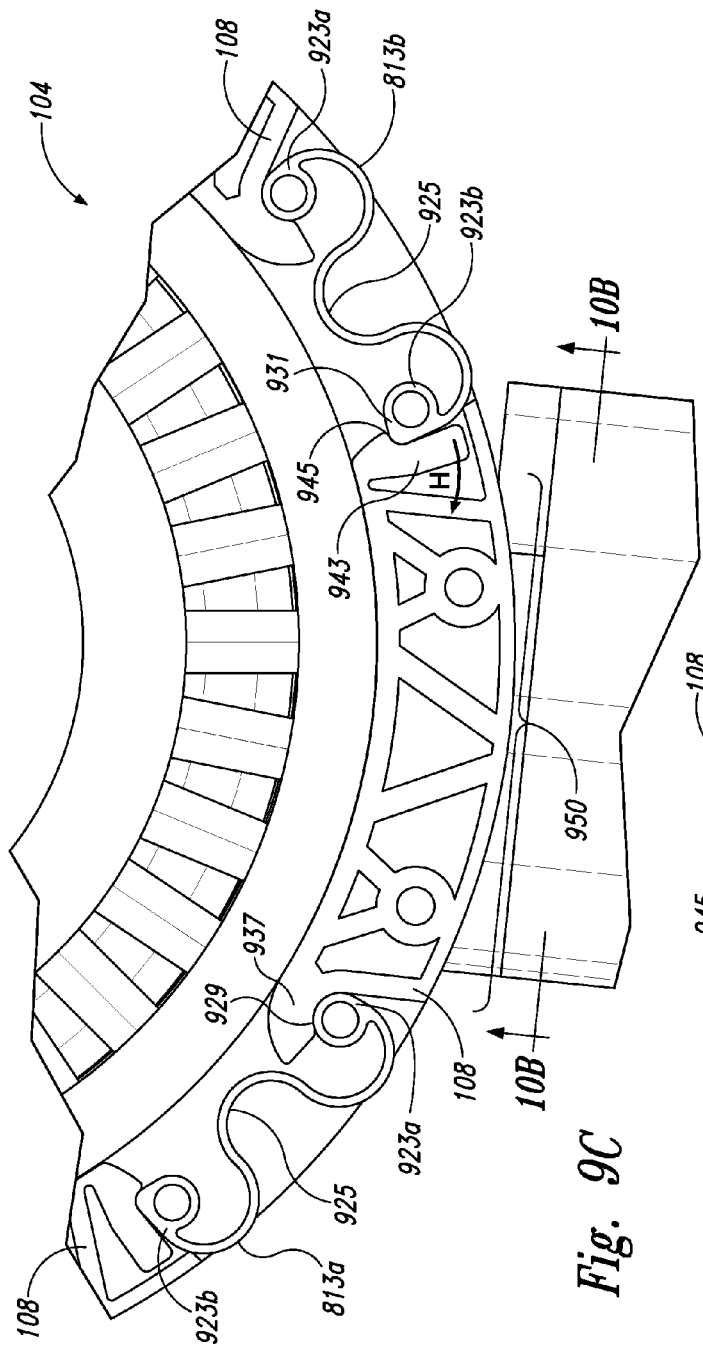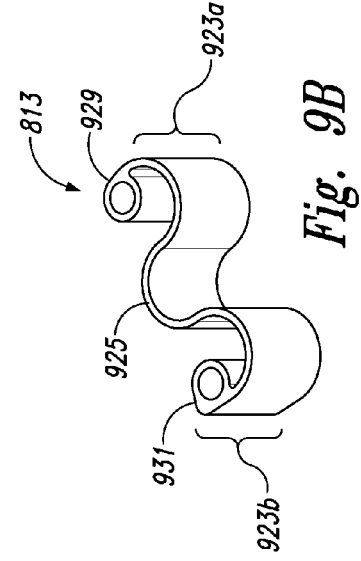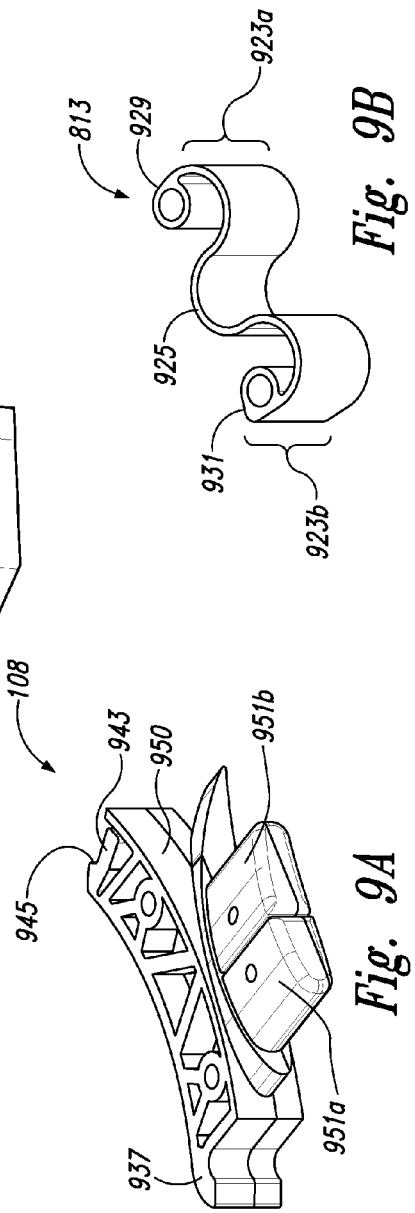
Fig. 9A
Fig. 9B
Fig. 9C

FAN BLADES AND ASSOCIATED BLADE TIPS

TECHNICAL FIELD

The present technology relates generally to ceiling fans and, more particularly, to lightweight, high efficiency fan blade tips.

BACKGROUND

Multi-blade, high volume low speed (HVLS) cooling fans are often used in warehouses, commercial buildings, loading docks, and other large structures to provide a comfortable work environment and/or to maintain suitable temperatures for product storage. Such fans are typically hung from the ceiling, and can include a plurality of blades extending outwardly from a central, motor-driven hub. In operation, HVLS fans rotate at relatively low speeds to produce a large downdraft of slowly moving air.

Conventional ceiling fan blades are generally flat and have constant cross-sections from root to tip. Others can include upwardly-angled airfoil extensions or winglets on the tips, or flat plates that simply cap off the tips as taught in, for example, U.S. Pat. Nos. 7,252,478, 7,284,960, 7,654,798, 8,162,613, and 8,821,126. While these tip devices may reduce aerodynamic drag, they also increase the weight of the blades at their outer ends. The increased weight at the blade ends can increase the rotational inertia of the fan and have a negative effect on performance, which can also lead to increased power consumption. Accordingly, reducing the weight of blade tip devices is desirable.

BRIEF DESCRIPTION OF THE DRAWINGS

FIG. 4A is a partially-exploded, top isometric view showing the blade tip of FIG. 2 removed from the outboard end portion of the fan blade, and FIG. 4B is a cross-sectional end view of the fan blade taken generally along line 4B-4B of FIG. 2.

FIGS. 9A and 9B are top isometric views of a blade mounting bracket and a hub retainer, respectively, configured in accordance with an embodiment of the present technology, and FIG. 9C is an enlarged top view of a portion of the fan hub of FIG. 8, illustrating the blade mounting bracket and the hub retainer in more detail.

DETAILED DESCRIPTION

The following disclosure describes various embodiments of fan blade tips and other structures for use with various types of cooling fans. In some embodiments, a fan configured in accordance with the present technology includes a plurality of blades each having a blade tip attached to an end portion of a main airfoil. The blade tip can include a shaped body formed from a lightweight material that at least partially encases and encapsulates an internal support structure. In this embodiment, the body material defines the external surface and overall shape of the blade tip. In some embodiments, the blade tip can include a winglet having an airfoil surface.

Certain details are set forth in the following description and in FIGS. 1-12D to provide a thorough understanding of various embodiments of the present technology. Other details describing well-known structures and systems often associated with fans, fan blades, and related assemblies and structures, however, are not set forth below to avoid unnecessarily obscuring the description of the various embodiments of the technology.

Many of the details and features shown in the Figures are merely illustrative of particular embodiments of the technology. Accordingly, other embodiments can have other details and features without departing from the spirit and scope of the present technology. In addition, those of ordinary skill in the art will understand that further embodiments can be practiced without several of the details described below. Furthermore, various embodiments of the technology can include structures other than those illustrated in the Figures and are expressly not limited to the structures shown in the Figures. Moreover, the various elements and features illustrated in the Figures may not be drawn to scale.

In the Figures, identical reference numbers identify identical or at least generally similar elements. To facilitate the description of any particular element, the most significant digit or digits of any reference number refer to the Figure in which that element is first introduced. For example, element 106 is first introduced and described with reference to FIG. 1.

Figure 1:
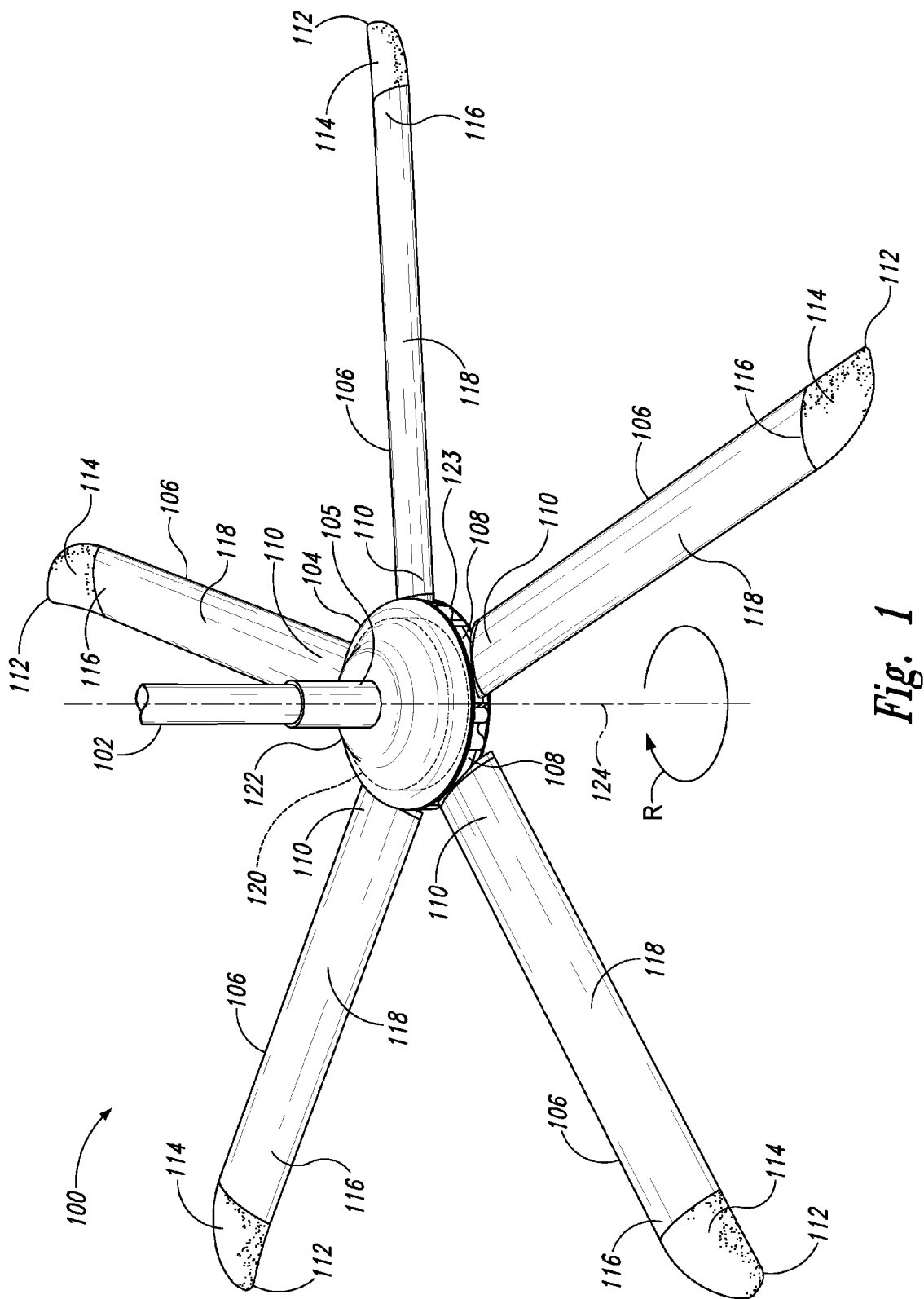
FIG. 1 is a top isometric view of a fan configured in accordance with an embodiment of the present technology.

FIG. 1 is a top isometric view of a fan 100 having blade tips configured in accordance with an embodiment of the present technology. In the illustrated embodiment, the fan 100 is an HVLS fan that can be attached to a ceiling or other elevated structure with a mounting bracket (not shown) and suspended therefrom by a hanger 102. The vertical length of the hanger 102 can be selected so that the fan 100 hangs at a suitable height above the floor (not shown) beneath the fan 100. The fan 100 includes a central hub 104 having a mounting tube 105 that attaches to the hanger 102, and a plurality of fan blades 106 (e.g., five fan blades 106) securely attached to the hub 104 and extending radially outward therefrom. In one embodiment described below, each of the blades 106 can be individually attached to the hub 104 by a corresponding blade mounting bracket 108. In other embodiments, the fan blades 106 can be attached to the hub 104 by a different type of blade mounting device or structure. For example, in some embodiments, the fan blades 106 can be attached to the hub 104 with a blade mounting structure as disclosed in U.S. patent application Ser. No. 14/166,663, filed Jan. 28, 2014, and titled "Fan with Fan Blade Mounting Structure," which is incorporated herein in its entirety by reference.

The fan blades 106 can have a length from an inboard end 110 at the hub 104 to a tip end 112 of from about 3 ft. to about 14 ft. or more, such as from about 6 ft. to about 12 ft., or about 10 ft. In some embodiments, these blade lengths can result in an outer fan diameter of from about 6 ft. to about 30 ft. or more, such as from about 12 ft. to about 26 ft., or about 20 ft. to about 24 ft. In other embodiments, the fan can have more or fewer blades, the blades 106 can have other lengths, and the fan 100 can have other outer diameters.

As described in greater detail below, in the illustrated embodiment, each fan blade 106 includes a lightweight blade tip 114 ("blade tip 114") fixedly attached to a distal or outboard end portion 116 of a main airfoil 118 (e.g., an extruded aluminum airfoil). In use, the individual blade tips 114 can improve the efficiency of the fan 100 by reducing aerodynamic drag on the corresponding fan blades 106 during operation.

In the illustrated embodiment, the hub 104 includes a direct drive motor 120 (shown in hidden lines) enclosed between an upper hub cover 122 and a lower hub cover 123. In an alternate embodiment, the hub 104 can be driven by a geared electric motor. In operation, the fan motor 120 rotates the hub 104 and the blades 106 about a central axis 124 at a rotational speed of, e.g., 10 to 250 rpm, or from 10 to 100 rpm. In FIG. 1, the blades 106 rotate in the direction of arrow R (e.g., clockwise if viewed from above). In some embodiments, a user can control the rotational speed and/or the direction of rotation using, for example, a wall-mounted control panel and/or a wireless controller coupled to a controller (e.g., a control signal processor device; not shown) of the fan motor 120. As the fan blades 106 revolve around the central axis 124, they can produce a moving volume of air, e.g., a column of air (not shown) that moves in a generally downward and/or upward direction, depending on the direction of rotation of the fan blades 106.

Figure 2:
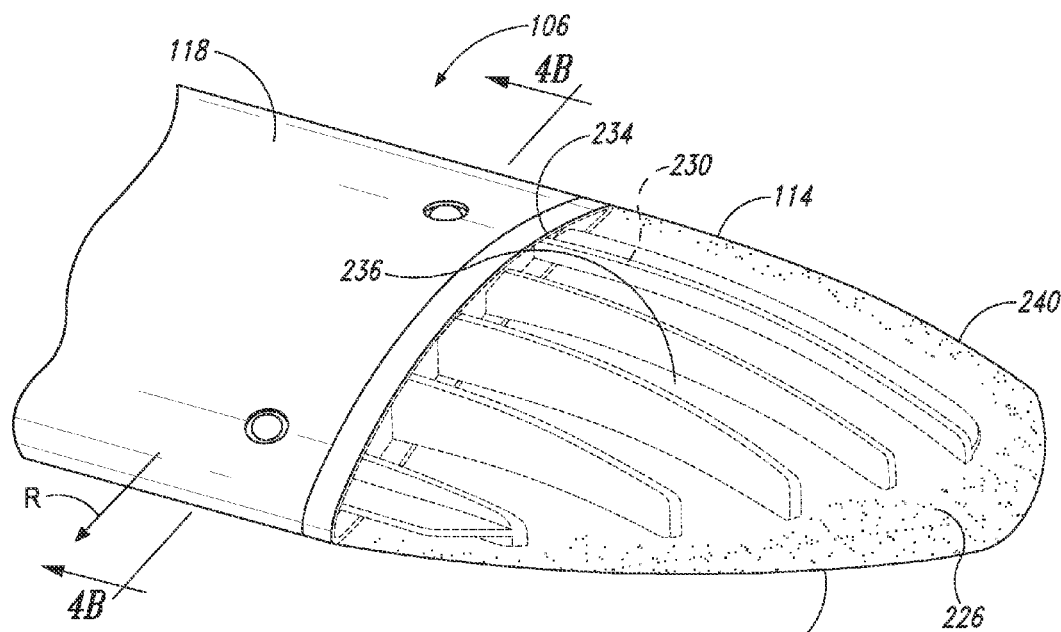
FIG. 2 is an enlarged top isometric view of an end portion of a fan blade having a fan blade tip configured in accordance with an embodiment of the present technology.

FIG. 2 is an enlarged top isometric view of the blade tip 114 configured in accordance with an embodiment of the present technology. In FIG. 2, the fan blade 106 rotates in the direction of arrow R. The blade tip 114 includes a shaped body 226 supported by a generally rigid internal support structure 230 (shown in hidden lines). In some embodiments described in greater detail below, the body 226 is formed from a lightweight material (e.g., foam material) that is disposed around and at least generally encases the internal support structure 230. In general, the material of the body 226 is configured to provide suitable resiliency, flexibility, durability, compressibility, and/or other properties suitable for retaining a predetermined shape during rotation of the fan blade 106. In some embodiments, the material of the body 226 may maintain its predetermined shape during rotation, but can compress and/or deflect upon impact with a foreign object.

In one aspect of the illustrated embodiment, the support structure 230 can be formed from a first material having a first density (i.e., a volumetric mass density), while the shaped body 226 can be formed from a second material, or body material, having a second density that is less than the first density. For example, in some embodiments the support structure 230 can comprise a plastic (e.g., high-density polymer), a composite (e.g., fibre-reinforced plastic resin), or carbon fiber treated epoxy, and/or cast metal (aluminum, steel, and/or steel alloy), while the body 226 can comprise a relatively lower density material, such as a foam (e.g., an open and/or closed cell foam) and/or a plastic (e.g., low-density thermoplastic elastomers (TPEs)). In the illustrated embodiment, the support structure 230 comprises an injection-molded plastic, and the body 226 comprises a foam material, such as polyurethane foam rubber. In one embodiment, the support structure 230 can be formed from acrylonitrile butadiene styrene (ABS), and the body 226 can be formed from polyeurethane. In one aspect of this embodiment the ABS material can have a density of from about 20 pounds per cubic foot (pcf) to about 60 pcf or more, and the polyeurethane foam can have a density of from about 1.0 pcf to about 20 pcf, or more, such as from about 1.5 pcf to about 15 pcf, or about 1.8 pcf to about 6 pcf. As used herein, the term "foam" can refer to any of variety of materials formed by trapping pockets of gas in a liquid or solid, including polyurethane foams, polystyrene foams, phenolic foams, or any other suitable manufactured foams, such as expanded and/or extruded foams.

In the illustrated embodiment, the body 226 is configured to define the surface and overall shape of the blade tip 114. For example, in the illustrated embodiment, the body 226 defines an airfoil surface 236 having a generally straight trailing edge 240 and a curved leading edge 238. In other embodiments, the blade tip 114 can have a different shape, including shapes that have a curved trailing edge and/or a generally straight leading edge. In these and other embodiments, the body 226 can define the surface 236 in the absence of a skin, cover, or other material forming the surface 236. This approach can simplify the blade tip 114 and reduce the number of parts required to form the blade tip 114.

Figure 3:
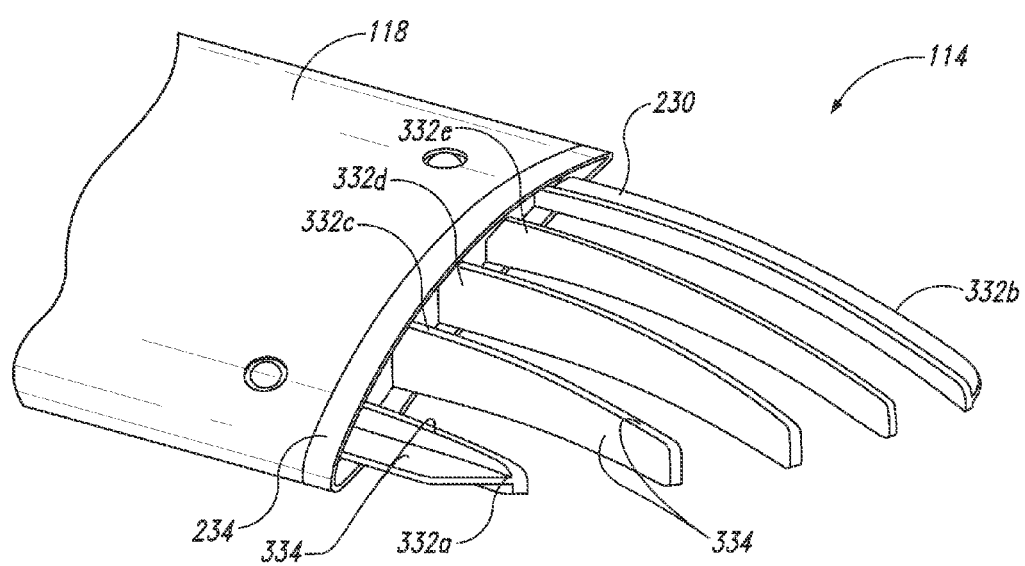
FIG. 3 is a top isometric view of the blade tip of FIG. 2 with a body portion removed to show an internal support structure configured in accordance with an embodiment of the present technology.

FIG. 3 is an isometric top view of the blade tip 114 with the body 226 (FIG. 2) removed to show the internal support structure 230 configured in accordance with an embodiment of the present technology. In the illustrated embodiment, the support structure 230 includes a first outer support element 332a proximate the blade tip leading edge 238, a second outer support element 332b proximate the trailing edge 240, and a plurality of inner support elements 332c-e positioned between the outer support elements 332a, b. The individual support elements 332 each have an exterior surface 334 that is in surface-to-surface contact with the body material when encased in the body 226 (FIG. 2).

In FIG. 3, the support elements 332 are at least approximately evenly-spaced apart, staggered in length, and generally straight and parallel with one another. In this embodiment, the individual support elements 332 project toward the leading edge 238 at individual distances configured to complement the shape (e.g., the curvature) of the leading edge 238. For example, each of the support elements 332 has a length selected to correspond to a planform defined by the body 226. That is, the distal ends of the individual support element's 332 can describe a curve that is generally equivalent or at least substantially similar to the curve or other shape of the body 226. In other embodiments, however, the support elements 332 do not complement or correspond to the shape of the body 226. For example, in an alternate embodiment, the support elements 332 can have the same length. Further, in some embodiments, the support elements 332 can be non-parallel, unevenly spaced, and/or bent or curved forwardly, aft, upwardly, and/or downwardly, etc.

In general, the length, number, shape, and/or material of the support elements 332 can be selected to increase durability of the blade tip 114 and reduce deformation (e.g., bending, twisting, etc.) of the body 226 during rotation of the blade 106. For example, support elements 332 configured to extend all the way to the leading edge 238 can reinforce the tip end 112. In other embodiments, support elements 332 that extend only half this distance, or less than half this distance may provide suitable support. Additionally, a blade tip 114 with closely-spaced support elements 332 (e.g., eight closely-spaced support elements) may provide more support than a similar tip constructed with widely-spaced support elements (e.g., three support elements). Further, the shape of the support elements 332 can be adapted to provide differing types of support. For example, in the illustrated embodiment, the inner support elements 332c-e have a planar shape that increases longitudinal stiffness and surface-to-surface contact with the bulk of the body 226, while the outer support elements 332 a, b, have a "T" shape that reinforces the leading and trailing edges 238 and 240, providing longitudinal and transverse stiffness. In other embodiments, the support elements 332 can have other shapes, such as an "I-beam" shape, a cylindrical shape, etc. Further, the support structure 230 can include additional support features, such as meshwork and/or lateral ribs (not shown) positioned between each of the support elements 332.

FIG. 4A is a partially-exploded, top isometric view showing the blade tip 114 removed from the main airfoil 118, and FIG. 4B is a cross-sectional end view of the fan blade 106 taken generally along line 4B-4B of FIG. 2. Referring to FIGS. 4A and 4B together, in this embodiment the airfoil 118 includes an internal web 452 extending generally vertically along a longitudinal axis of the airfoil 118 and separating a leading edge cavity 454a from a trailing edge cavity 454b. The web 452 can be a stiffening structure that is integrally formed with (e.g., by a metal extrusion process) or attached (e.g., welded) to an outer wall 462 of the airfoil 118.

Referring to FIG. 4A, the base member 234 includes a plurality of insert portions 460a-c extending outwardly from a raised abutment feature 458 that contacts the outer edge of the blade wall 462 when the blade tip 114 is fully installed on the airfoil 118. As shown in FIG. 4A, the first insert portion 460a inserts into the leading edge cavity 454a, the second insert portion 460b inserts into the trailing edge cavity 454b, and the third insert portion 460c also inserts into the trailing edge cavity 454b between the second insert portion 460b and the web 452. Referring to FIG. 4B, in the illustrated embodiment, the insert portions 460a-c are hollow and have corresponding interior regions 461a-c. In other embodiments, however, the insert portions 460a-c may be solid filled. In some embodiments, the insert portions 460a-c can include a contoured surface that at least partially conforms to the shape and profile (e.g., curvature) of the leading and/or trailing edge cavities 454a, b to facilitate a snug or close fit between the blade tip 114 and the airfoil 118. The abutment feature 458 can also have a contoured surface with a profile configured to provide a continuous and smooth transition between the surface 236 of the blade tip 114 and an adjacent surface 466 of the airfoil 118.

Referring again to FIG. 4A, the base member 234 further includes a plurality of integral locking features, such as cantilevered spring tabs 468, cut into the walls of the opposite bottom and top sides of the first and second insert portions 460a, b. The individual spring tabs 468 include a protruding engagement feature, such as a round distal bump 472. During insertion of the blade tip 114 into the airfoil 118, the distal bumps 472 contact the inner surfaces of the outer blade wall 462, which causes the spring tabs 468 to resiliently deflect inwardly into the corresponding interior regions 461a, b (FIG. 4B). When the blade tip 114 is fully inserted into the airfoil 118, the spring tabs 468 bias the distal bumps 472 into a corresponding lock recess or hole 474, thereby securing the base member 234 within the airfoil 118. To release the blade tip 114 from the airfoil 118, the distal bumps 472 can be pushed out of their corresponding holes 474 by simultaneously manually depressing the individual bumps 472 from the surface 466 of the airfoil 118 and/or by pulling the blade tip 114 away from the airfoil 118 with sufficient force so as to cause the distal bumps 472 to retract from the holes 474. In one aspect of this embodiment, the spring tabs 468 enable the blade tip 114 to be attached to the airfoil 118 without the use of separate fasteners.

Figure 5A:
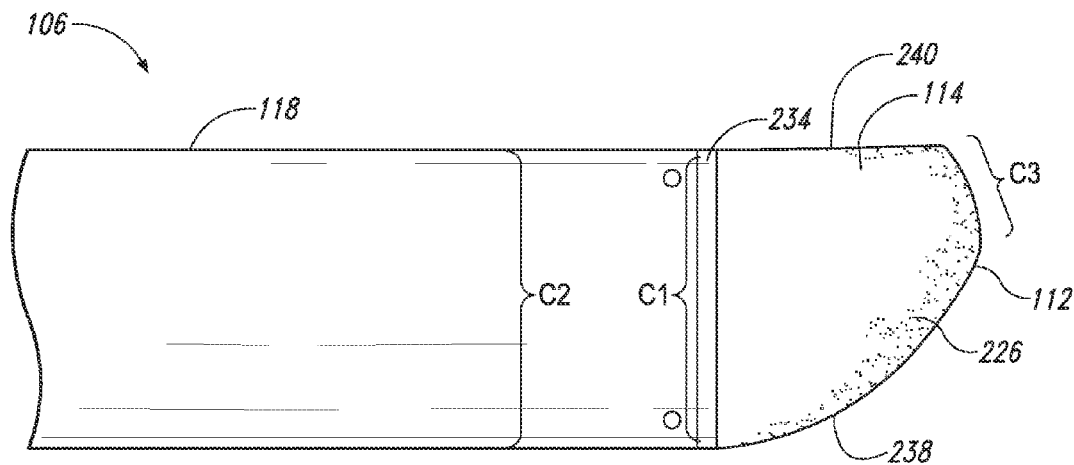
FIGS. 5A-5C are corresponding top, front, and end views, respectively, of a blade tip configured in accordance with an embodiment of the present technology.
Figure 5B:
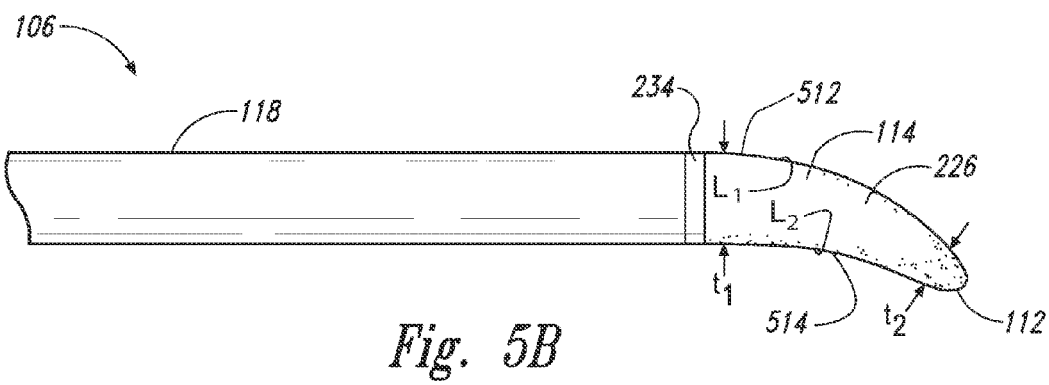
Figure 5C:
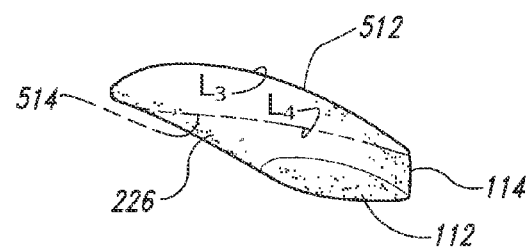

FIGS. 5A-5C are corresponding top, front, and end views, respectively, of the blade tip 114 configured in accordance with an embodiment of the present technology. Referring to FIG. 5A, the body 226 can form an airfoil having an inboard chord C1 with a chord length that is equal to or at least similar to a chord C2 of the airfoil 118. As shown, the body 226 can taper outwards from the inboard chord C1 to an outboard chord C3. In this example, the leading edge 238 forms a parabolic curve, which blends with a perpendicular edge near the intersection with the trailing edge 240. Referring to FIG. 5B, the thickness of the body 226 decreases or tapers toward the outboard chord C3. More specifically, the body 226 has a first thickness $t_1$ near the airfoil 118 and a second thickness $t_2$ less than the first thickness near the tip end 112. Further, the body 226 can extend downwardly relative to the horizontal plane of the airfoil 118. In the illustrated embodiment, the blade tip 114 has an upper airfoil surface 512 having a longitudinal length $L_1$, and a lower airfoil surface 514 having a longitudinal length $L_2$ that is less than the longitudinal length $L_1$ of the upper airfoil surface 512. As shown in FIG. 5C, the upper airfoil surface 512 can have a transverse length $L_3$ that is greater than a corresponding transverse length $L_4$ of the lower airfoil surface 514 (shown in phantom lines). In some embodiments, the body 226 can have a profile or shape as disclosed in U.S. patent application Ser. No. 13/302,507, filed Nov. 22, 2011, and titled "Fan blade tips," which is incorporated herein in its entirety by reference.

In one aspect of this embodiment, the relatively low-density material of the body 226 reduces inertial losses during operation of the fan 100. More specifically, the body 226 reduces the inertial mass associated with rotation of the blade tip 114 about the central axis 124 (FIG. 1). In general, the moment of inertia associated of the blade tip 114 is proportional to the square of the distance between the blade tip 114 and the axis of rotation 124. As is known, an object having a large moment of inertia requires more torque to rotationally accelerate than does an object having less moment of inertia. In the case of the blade tip 114, the reduced moment of inertia decreases motor torque needed to drive rotation of the fan 100. This is especially so for large diameter fans, such as the fan 100. As such, the fan 100 can use less power and operate more efficiently than fans having blades with relatively heavier blade tips. For example, in some embodiments the fan 100 can ramp up to a desired output speed using less motor torque than would be required if the fan had heavier blade tips. Further, the lower operating power of the fan motor 120 (FIG. 1) can reduce the likelihood of overheating or motor burn out. Another advantage of the lightweight blade tips 114 is that they reduce the overall weight of the fan blades 106, which can lessen the load on the components of the fan 100 that bear the weight of the blades 106. This, in turn, can reduce wear and frictional losses that occur at the rotational components of the fan 100 (e.g., the hub bearings). Yet another advantage is that the blade tips 114 can have an aerodynamic shape (e.g., an airfoil shape), which reduces losses due to aerodynamic drag. Accordingly, all of the foregoing factors contribute to a cooling fan blade that generates less aerodynamic drag, thereby improving efficiency and reducing power requirements for a given output.

Figure 6A:
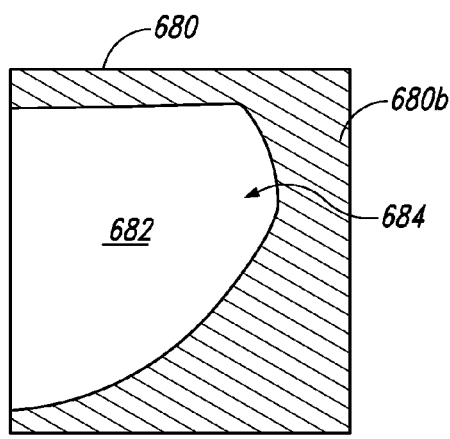
FIG. 6A is a cross-sectional top view.
Figure 6B:
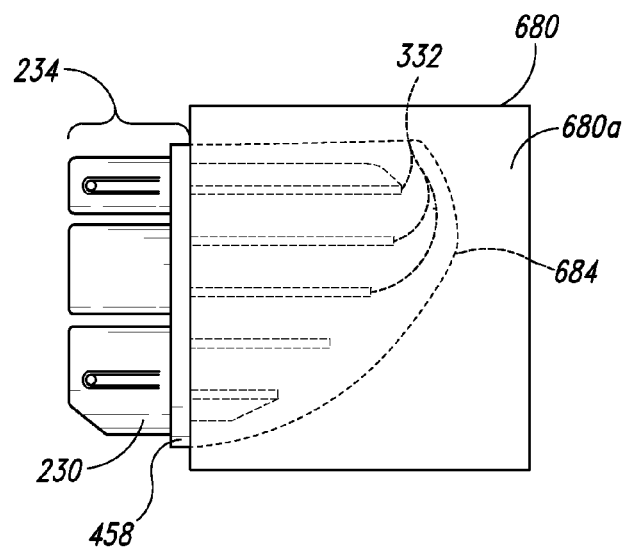
FIGS. 6B and 6C are corresponding top views illustrating a method of manufacturing a fan blade tip in accordance with an embodiment of the present technology.
Figure 6C:
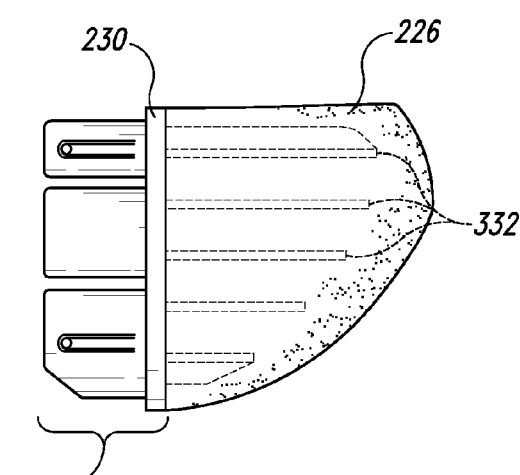

FIG. 6A is a cross-sectional top view, and FIGS. 6B and 6C are corresponding top views illustrating a method of manufacturing a fan blade tip, such as the fan blade tip 114, in accordance with an embodiment of the present technology. In the embodiment described below, the material of the body 226 of the blade tip 114 can be formed around the internal support structure 230 using known overmolding techniques (e.g., insert molding, multiple material molding, etc.). In other embodiments, however, the blade tip 114 can be formed using other techniques, such as casting, machining, 3D-printing, etc. Referring to FIG. 6A, the body 226 is formed using a two-piece mold 680 (e.g., a female mold). For purposes of illustration, a first or upper half 680a (FIG. 6B) of the mold 680 has been removed to show a mold surface 682 in a second or lower half 680b of the mold 680.

Referring to FIG. 6B, the upper mold half 680a is assembled with the lower mold half 680b (FIG. 6A), and the support structure 230 is inserted into a mold cavity 684 of the mold 680. The mold cavity 684 defines the internal mold surfaces (including the mold surface 682) that correspond to the desired shape of the blade tip 114, such as one of the shapes described above. As further shown in FIG. 6B, the support structure 230 is positioned in the mold 680 such that the individual support elements 332 extend into the cavity 684, while the base member 234 remains outside of the cavity 684. In one aspect of this embodiment, the raised abutment feature 458 can at least partially seal the cavity 684 to prevent the uncured body material (not shown) from escaping during molding.

Once the mold 680 is assembled and the support structure 230 is inserted into the mold cavity 684, an uncured mold compound, such as a foam, is injected into the cavity 684 (e.g., via one or more injection ports; not shown) to form the shape of the blade tip 114 and to bond the body 226 to the support structure 230. In one aspect of this embodiment, the body material is bonded to the entire exterior surface 334 (FIG. 3) of each of the support elements 332, thereby encasing the support structure 230 within the body 226. In some embodiments, foaming agents, adhesives, additives, and/or other materials can be incorporated into the body material or separately deposited on the support structure 230 to facilitate foaming, bonding, etc. Referring to FIG. 6C, the blade tip 114 has been removed from the mold 680 after the body 226 has cooled and/or cured. As shown, the resultant body 226 covers the support elements 332, and the base member 234, which was not inserted into the mold cavity in FIG. 6B, remains exposed.

Figure 7A:
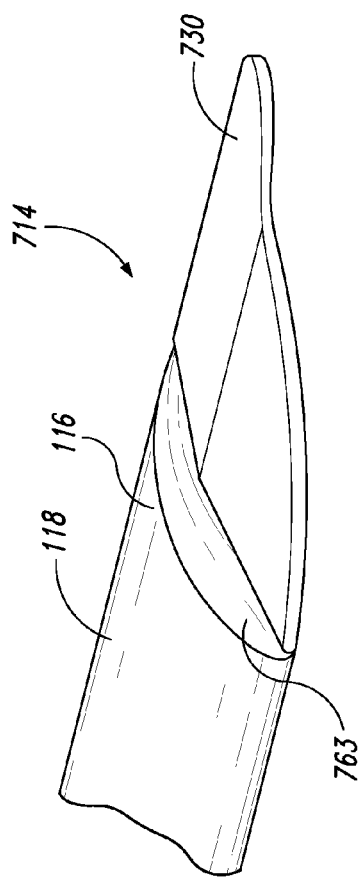
FIG. 7A is a top isometric view.
Figure 7B:
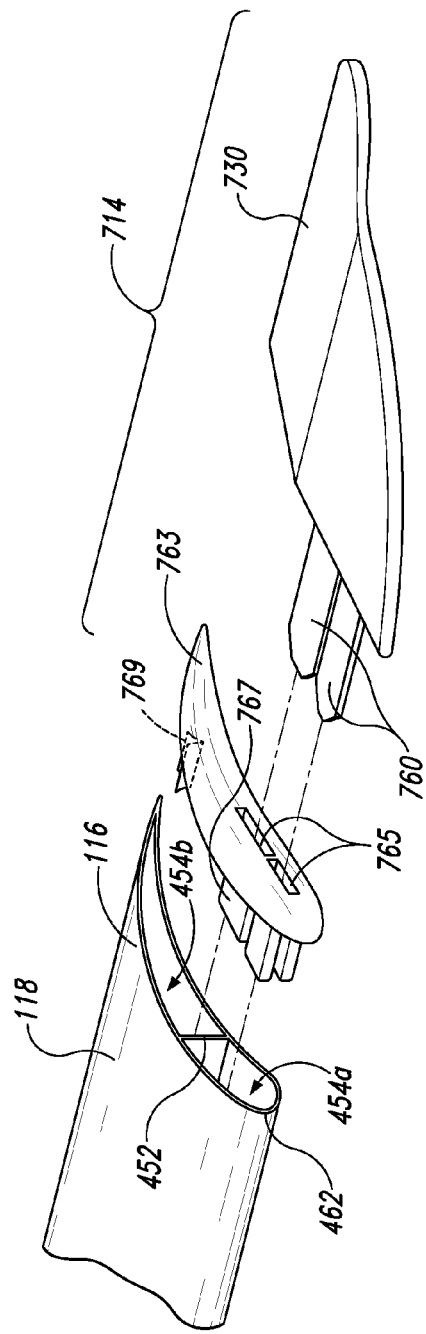
FIG. 7B is a partially-exploded, top isometric view of a fan blade tip configured in accordance with another embodiment of the present technology.

FIG. 7A is a top isometric view, and FIG. 7B is a partially-exploded, top isometric view of a fan blade tip 714 configured in accordance with another embodiment of the present technology. In this embodiment, the blade tip 714 includes a body 730 and an adaptor 763 that inserts into the outboard end portion 116 of the airfoil 118. The body 730 can be a single piece of rigid material that is molded, formed, and/or otherwise shaped to define an airfoil. In one embodiment, the body 730 can be formed from a flat piece of solid material (e.g., plastic or aluminum) that has a generally constant thickness. For example, in one embodiment, the material can have a generally constant thickness of about ⅛ inch. In some embodiments, the material can be relatively thin and lightweight to reduce the weight of the blade tip 714, which, in turn, can reduce its inertial mass as described above.

Referring to FIG. 7B, the body 730 can include one or more, e.g., two, tangs or tabs 760 that insert snugly into corresponding slots or sockets 765 in the adaptor 763. The slots or sockets 765 extend into corresponding insert portions 767 in the adaptor 763 that flank each side of the web 452 (FIG. 4A) when the blade tip 714 is fully inserted. In one embodiment, the tabs 760 can bias the insert portions 767 against the inner surfaces of the outer blade wall 462 to securely attach the blade tip 114 to the outboard end portion 116 of the blade 106. In another embodiment, the tabs 760 and/or the insert portions 767 can be secured to the outer wall 462 with one or more fasteners, such as rivets (not shown). As further shown in FIG. 7B, the adaptor 763 can further include an outer insert portion 769 (shown in hidden lines) that slides into the trailing edge cavity 454b adjacent the trailing edge of the airfoil 118, further facilitating a snug fit and restricting movement of the adaptor 763 within the outboard end portion 116.

Figure 7C:
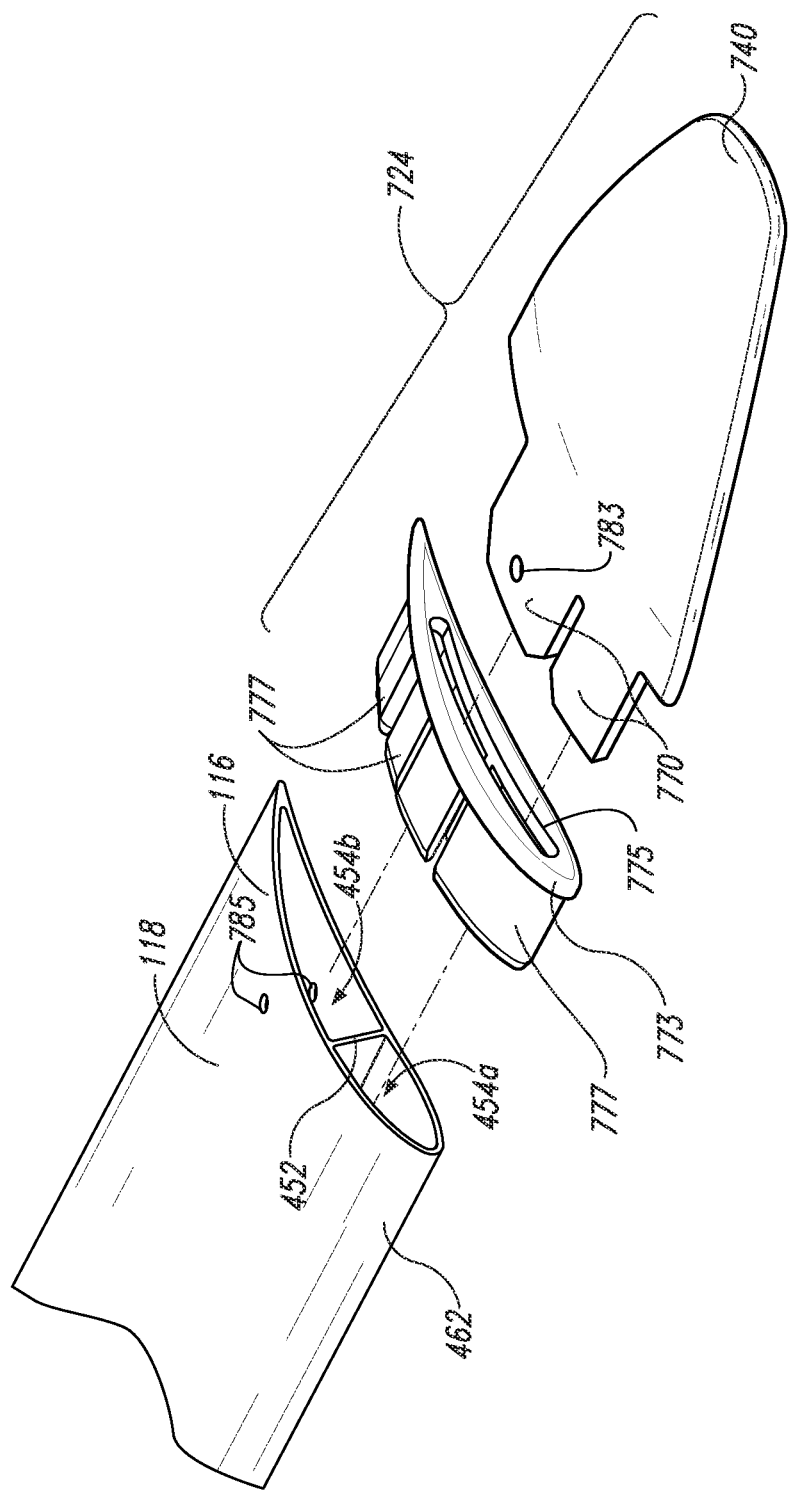
FIG. 7C is a partially-exploded, top isometric view of a fan blade tip configured in accordance with another embodiment of the present technology.

FIG. 7C is a partially-exploded, top isometric view of a fan blade tip 724 configured in accordance with another embodiment of the present technology. The fan blade tip 724 can include features generally similar in structure and function to those of the blade tip 714 described in detail above with reference to FIGS. 7A and 7B. For example, the blade tip 724 can include a body 740 and an adaptor 773 having insert portions 777 that insert into the leading and trailing edge cavities 454a and 454b of the outboard end portion 116 of the airfoil 118. Similar to the body 730 described above, the body 740 can include, e.g., two, tangs or tabs 770 that both insert snugly into a single slot 775 in the adaptor 773, and which flank opposite sides of the web 452 when fully inserted into the leading and trailing edge cavities 454a and 454b. In the embodiment of FIG. 7C, one of the tabs 777 includes a hole 783 configured to receive a fastener (e.g., a rivet; not shown) that extends through adjacent holes 785 in the upper and lower sides of the airfoil 118.

Figure 8:
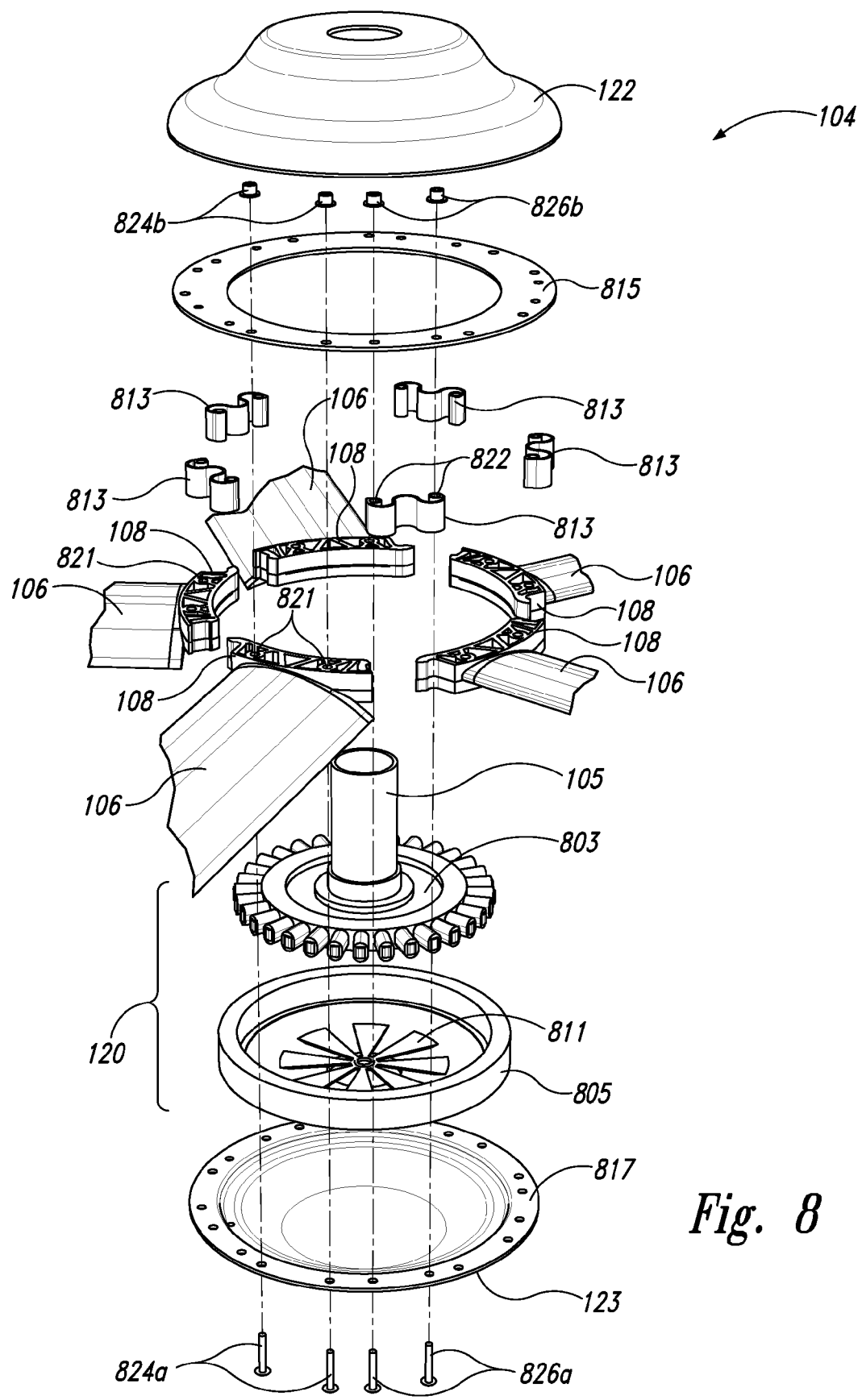
FIG. 8 is an enlarged, partially-exploded, top isometric view of a fan hub configured in accordance with an embodiment of the present technology.

FIG. 8 is an enlarged, partially-exploded, top isometric view of the hub 104 of FIG. 1 configured in accordance with an embodiment of the present technology. In the illustrated embodiment, the hub 104 includes a stator 803 and a concentric rotor 805 that together form the fan motor 120. The rotor 805 is carried on a rotatable hub 811 having a spindle (not shown) that extends into the hub mounting tube 105, which can house the hub bearings (not shown). The mounting tube 105, in turn, attaches the fan 100 to the hanger 102 (FIG. 1). In the illustrated embodiment, the hanger 102 can be a separate tube or shaft that abuts or at least partially slides into or over the mounting tube 105.

Each blade mounting bracket 108 fixedly attaches a corresponding airfoil 118 to a pair of corresponding retainers or spacers 813 which are securely sandwiched between an upper clamp plate 815 and a lower flange 817 of the lower hub cover 123. Each blade mounting bracket 108 can include two or more through holes 821 configured to receive fasteners 824a (e.g., hex-head bolts) that extend through adjacent holes in the upper plate 815 and lower cover 123, and which receive locking features 824b (e.g., lock nuts) to fixedly attach the mounting bracket 108 to the hub 104. The spacers 813 similarly include through holes 822 that receive fasteners 826a to secure the spacers 813 between the upper plate 815 and the lower cover 123 via locking features 826b (e.g., lock nuts).

FIGS. 9A and 9B are top isometric views of the blade mounting bracket 108 and the spacer 813, respectively, configured in accordance with an embodiment of the present technology. Referring to FIG. 9A, the mounting bracket 108 includes a base member 950 and one or more, e.g., two insert portions 951a, b projecting outwardly from the base member 950. The base member 950 includes a first engagement feature 937 and an opposite second engagement feature 943. In the example of FIG. 9A, the first engagement feature is in the form of a hook 937, and the second engagement feature is in the form of an integral release tab 943 having a locking feature or inner lip 945. Referring to FIG. 9B, the spacer 813 includes a first engagement feature 923a and an opposite second engagement feature 923b. In the illustrated embodiment, the first engagement feature is in the form a cylindrical pivot 923a having an outer pivot surface 929 with a curvature that generally corresponds to the inner curvature of the hook 937 (FIG. 9A). The second engagement feature is in the form of a catch 923b having a lip or inner shoulder 931.

FIG. 9C is an enlarged top view of a portion of the fan hub 104 showing the mounting bracket 108 installed between a pair of retention or spacer members 813a, b. As this view illustrates, the hook 937 of the base member 950 engages the pivot surface 929 of the first spacer 813a, and the release tab 943 engages the shoulder 931 of the second spacer 813b via the release tab 943. As shown by arrow H, the release tab 943 is configured to resiliently deflect so that inner lip 945 passes over and then engages the inner shoulder 931 of the catch 923b as the bracket 108 is installed.

Referring again to FIG. 9B, the individual spacers 813 have a curved outer wall 925. In the illustrated embodiment, the outer wall 925 extends along a serpentine path between the pivot 923a and the catch 923b. In one aspect of this embodiment, the curved outer wall 925 increases the surface area of the individual spacer 813, which can facilitate heat conduction through the wall 925, and thereby facilitate the dissipation of heat produced by the fan motor 120 (FIG. 8) during operation. In one embodiment, the individual spacers 813 are formed from aluminum (e.g., extruded aluminum) or another high thermal conductivity material (e.g., metallic materials), which can further facilitate heat dissipation. In another embodiment, the spacers 813 can be formed from a different material, such as an injection-molded plastic.

Figure 10A:
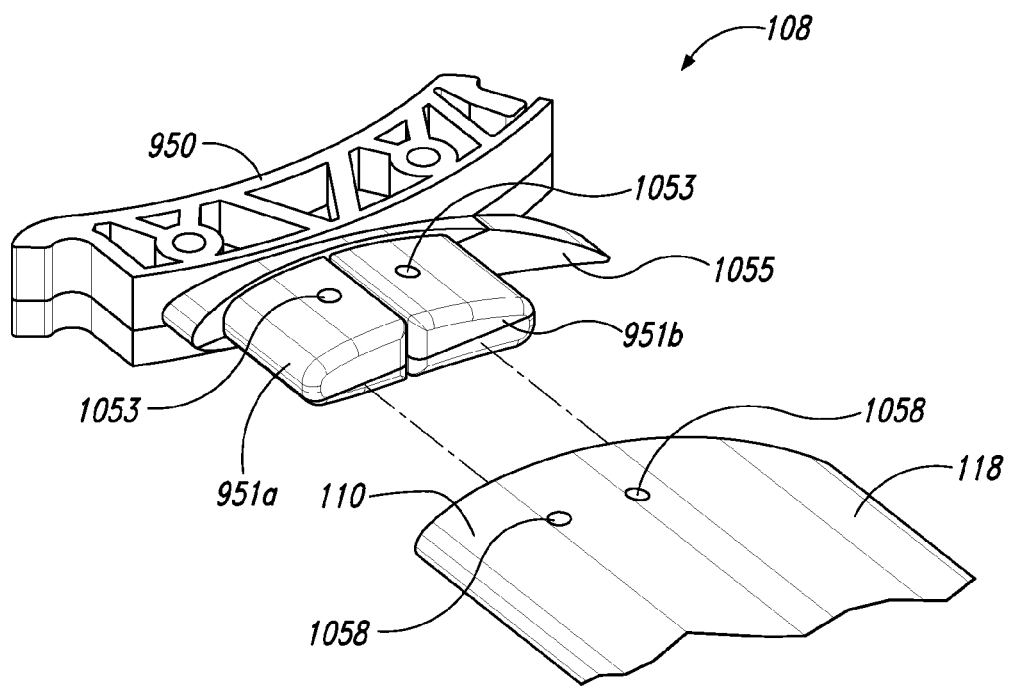
FIG. 10A is a partially-exploded, top isometric view showing a blade mounting bracket removed from the inboard end portion of a fan blade.
Figure 10B:
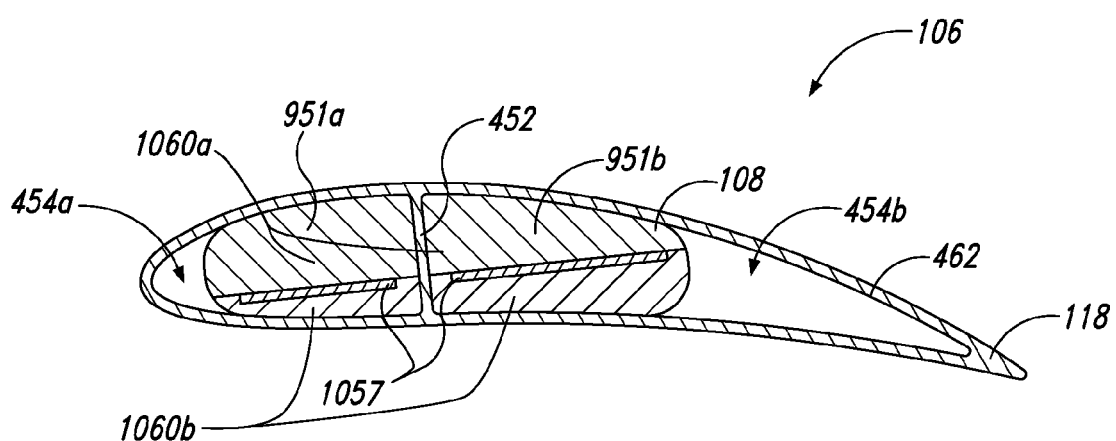
FIG. 10B is a cross-sectional end view of the fan blade taken generally along line 10B-10B in FIG. 9A.

FIG. 10A is a partially-exploded, top isometric view showing the blade mounting bracket 108 removed from the airfoil 118 of the blade, and FIG. 10B is a cross-sectional end view of the fan blade 106 and mounting bracket 108 taken generally along line 10B-10B in FIG. 9A. Referring to FIG. 10A, the insert portions 951a, b extend outwardly from an abutment feature 1055 of the base member 950 configured to contact the inner side of the outer wall 462 (FIG. 10B) of the airfoil 118 when it is fully installed on the mounting bracket 108. The first insert portion 951a inserts into the leading edge cavity 454a (FIG. 10B), and the second insert portion 951b inserts into the trailing edge cavity 454b (FIG. 10B). The individual insert portions 951a, b can include one or more through holes 1053 configured to receive fasteners (e.g., hex-head bolts; not shown) that extend through adjacent holes 1058 in the upper and lower sides of the airfoil 118, and which receive corresponding locking features (e.g., lock nuts; not shown) to fixedly attach the airfoil 118 to the mounting bracket 108. In some embodiments, the insert portions 951a, b can include a contoured surface that at least partially conforms to the shape and profile (e.g., curvature) of the leading and/or trailing edge cavities 454a, b to facilitate a snug or close fit between the mounting bracket 108 and the airfoil 118. The abutment feature 1055 can have a shape or profile that is substantially similar to the shape and profile of the inboard end 110 of the airfoil 118. In one aspect of this embodiment, the abutment feature 1055 is configured to substantially seal the openings of cavities 454a, b of the airfoil 118 not occupied by the blade insert portions 951. Accordingly, the abutment feature can form a seal that prevents dust, debris, insects, and/or other foreign objects or contaminants from entering the blade cavities 454a, b through the inboard end 110.

Referring to FIG. 10B, the mounting bracket 108 can further include an internal support element or metal insert 1057 sandwiched between a first or upper bracket half 1060a and a second or lower bracket half 1060b. The metal insert 1057 can be formed from a rigid metal, such as a steel alloy material. In one aspect of this embodiment, the metal insert 1057 can strengthen and stiffen the bracket 108, as well as the connection of the bracket 108 between the airfoil 118 and the hub 104. In a related aspect, the metal insert 1057 can provide additional support to the bracket 108 for retaining the blade 106 in a fixed position and orientation when mounted to the hub 104. In another aspect of this embodiment, the metal insert 1057 can reduce premature wear or damage to the mounting bracket 108 due to, e.g., the torsional load of the airfoil 118 during operation.

Figure 11:
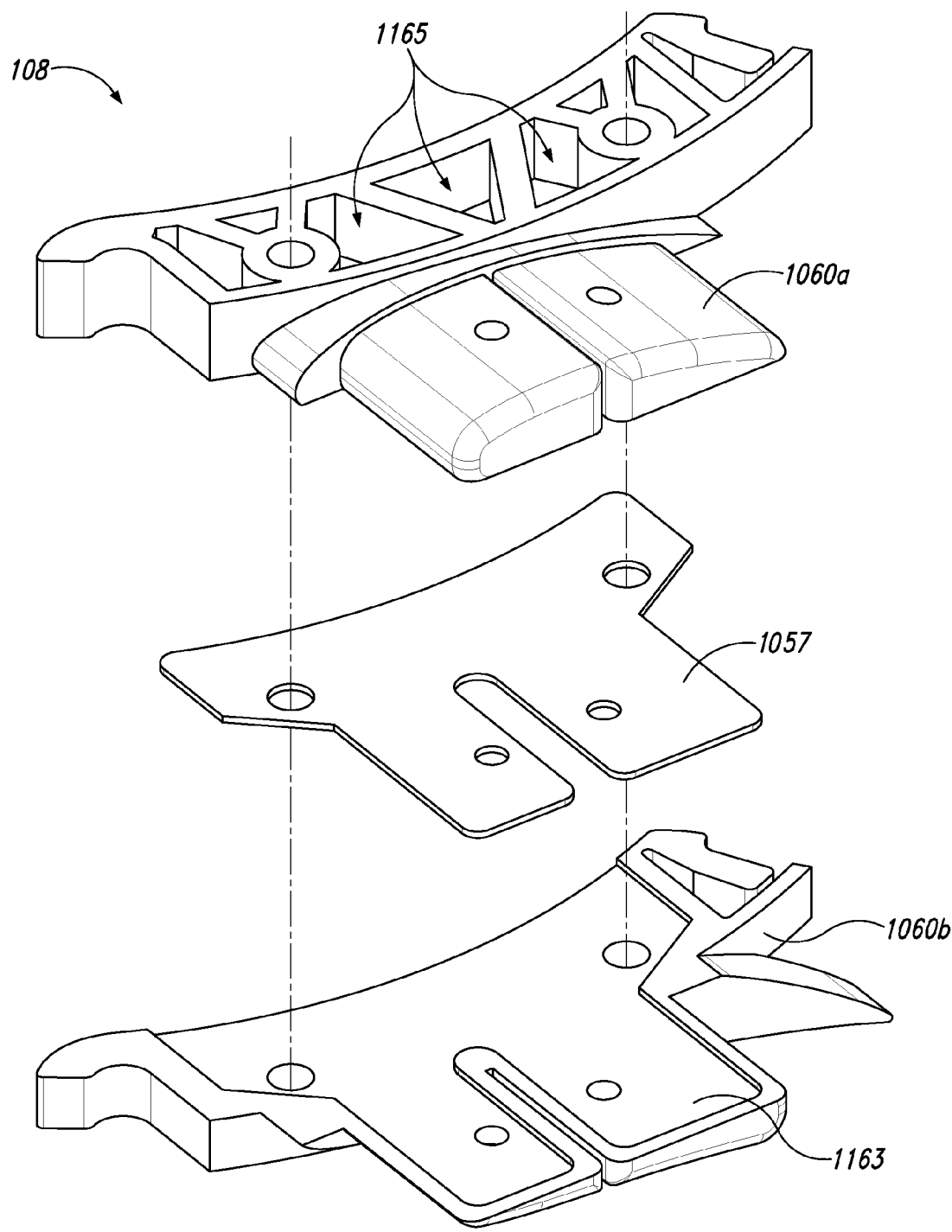
FIG. 11 is an exploded, top isometric view showing the blade mounting bracket of FIG. 10A in further detail.

FIG. 11 is an exploded, top isometric view showing the metal insert 1057 and the upper and lower halves 1060a, b of the blade mounting bracket 108 in further detail. In the illustrated embodiment, the metal insert 1057 is positioned in a patterned recess 1163 of the lower half 1060b, which holds metal insert 1057 in a fixed position within the bracket 108. The upper half 1060a can include cut-outs or openings 1165. In one embodiment, the openings 1165 are configured to reduce the amount of material used to form the upper half 1060b, which, in turn, can reduce the thermal mass of the mounting bracket 108 to facilitate the dissipation of heat produce by the fan motor 120 (FIG. 8) during operation. In one embodiment, the mounting bracket 108 can be formed from a rigid material, such as molded plastic or cast metal. Although shown in the illustrated embodiment as a multi-piece assembly having upper and lower halves 1060a, b, the mounting bracket 108 can be comprised of a single member in other embodiments.

Figure 12A:
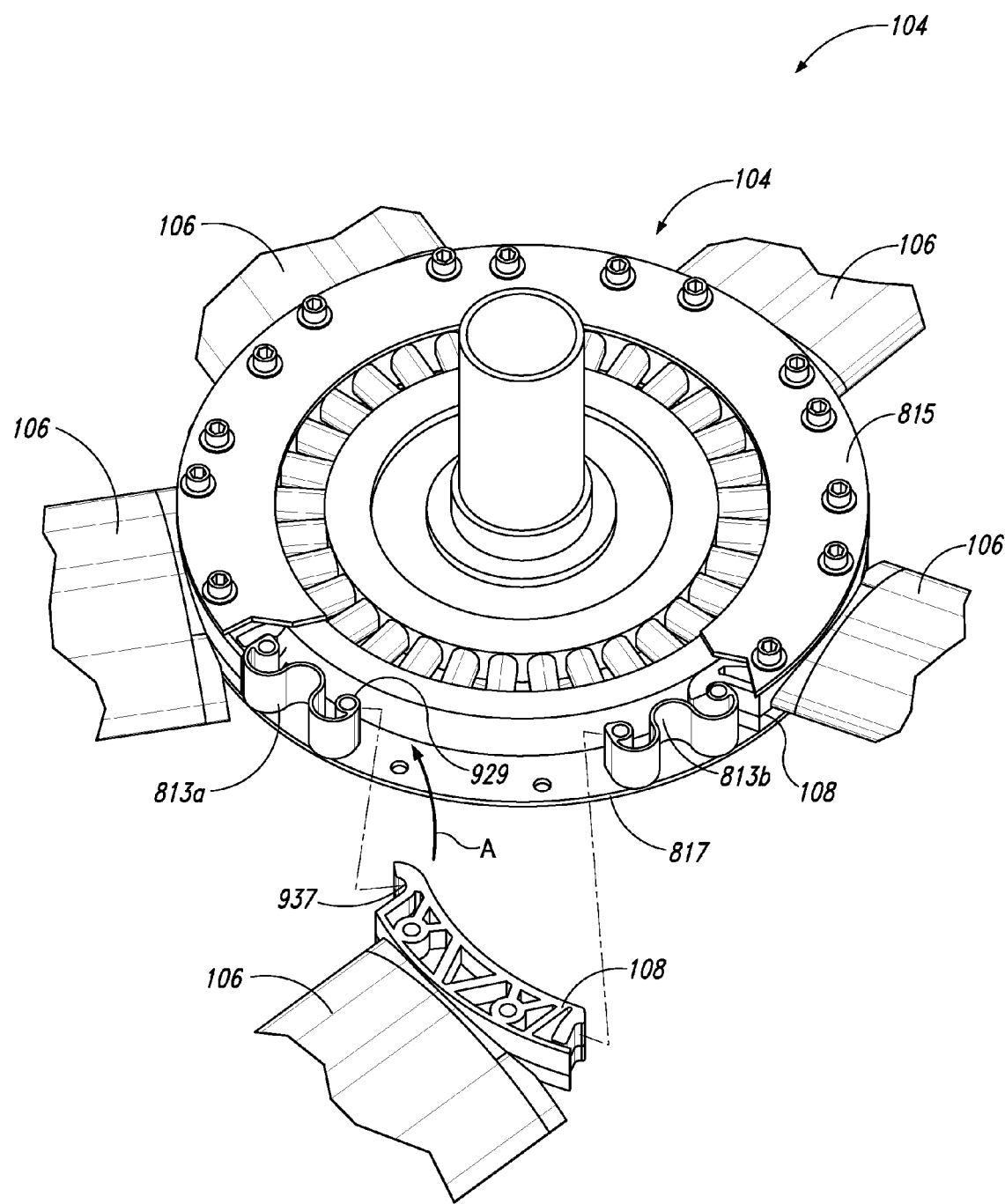
FIGS. 12A-12D are a series of top isometric views illustrating a method of installing an individual fan blade on a fan hub in accordance with an embodiment of the present technology.

FIGS. 12A-12D are a series of top isometric views of the fan hub 104 illustrating a method of installing a fan blade, such as the fan blade 106, in accordance with an embodiment of the present technology. In FIGS. 12A-12D, the upper hub cover 122 (FIG. 8) has been removed for purposes of illustration. FIG. 12A shows the fan blade 106 in a first stage of installation. At this stage the installer (not shown) has oriented the blade 106 so that it lies generally in the same horizontal plane as the adjacent fan blades 106, with the mounting bracket 108 positioned adjacent the fan hub 104. The installer can then move the blade 106 into position such that the hook 937 is adjacent the pivot surface 929 of the first spacer 813a, as shown by arrow A.

Figure 12B:
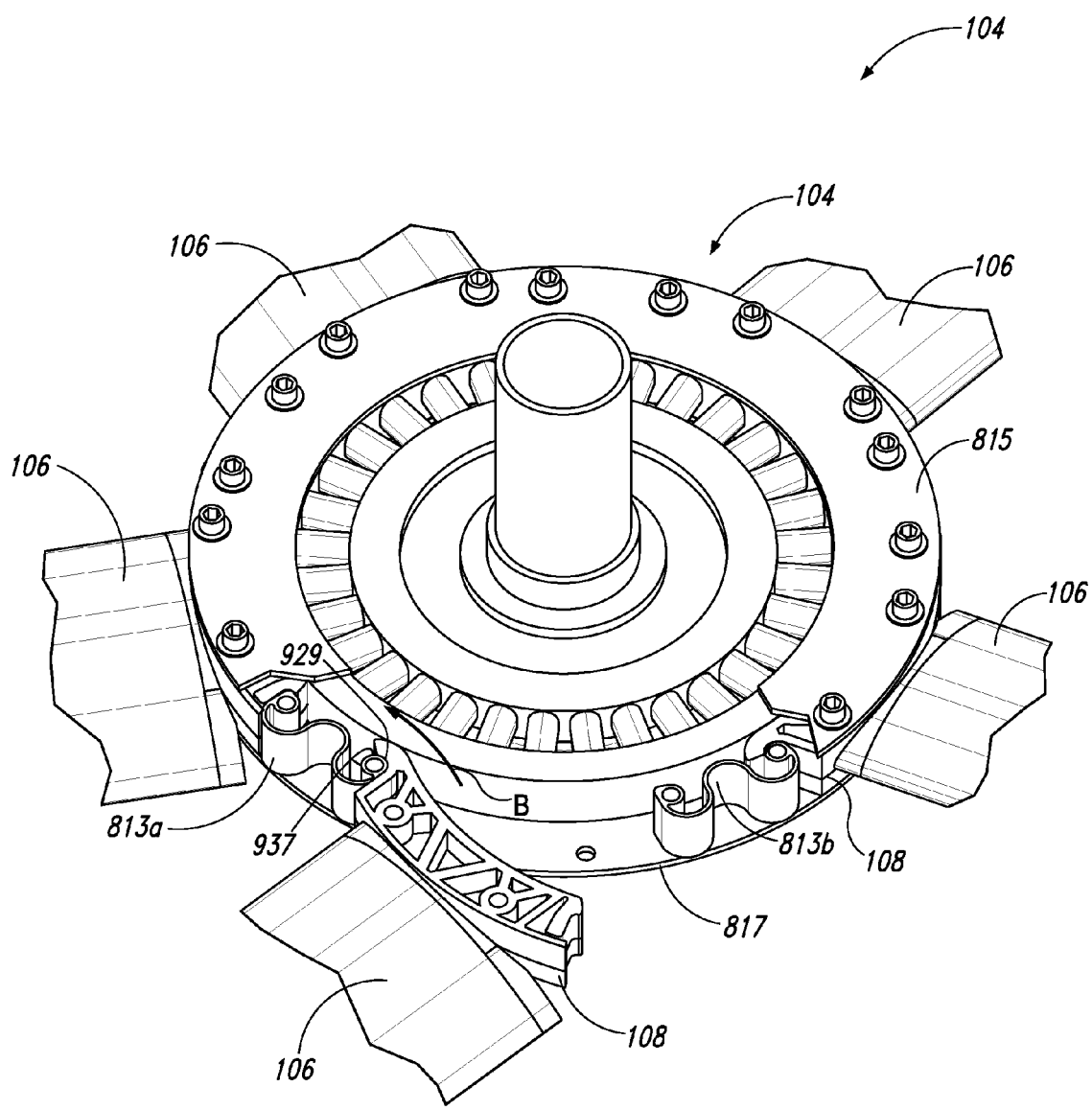

FIG. 12B shows the fan blade 106 in a second stage of installation. At this stage, the installer has pushed the fan blade 106 inwardly and against the hub 104 such that the hook 937 engages the pivot surface 929 of the first spacer 813a. While pushing the hook 937 against the pivot surface 929, the installer can then rotate or pivot the fan blade 106 about the pivot surface 929 in the direction of arrow B such that the inner hook 937 pivots about the pivot surface 929. As the installer pivots the blade 106, the mounting bracket 108 moves into the lateral space between the first and second spacers 813*a* and 813*b* and between the upper plate 815 (FIG. 8) and the lower flange 817. As the mounting bracket 108 moves into this space, the upper plate 815 and the lower flange 817 can begin to bear at least some of the weight of the fan blade 106.

Figure 12C:
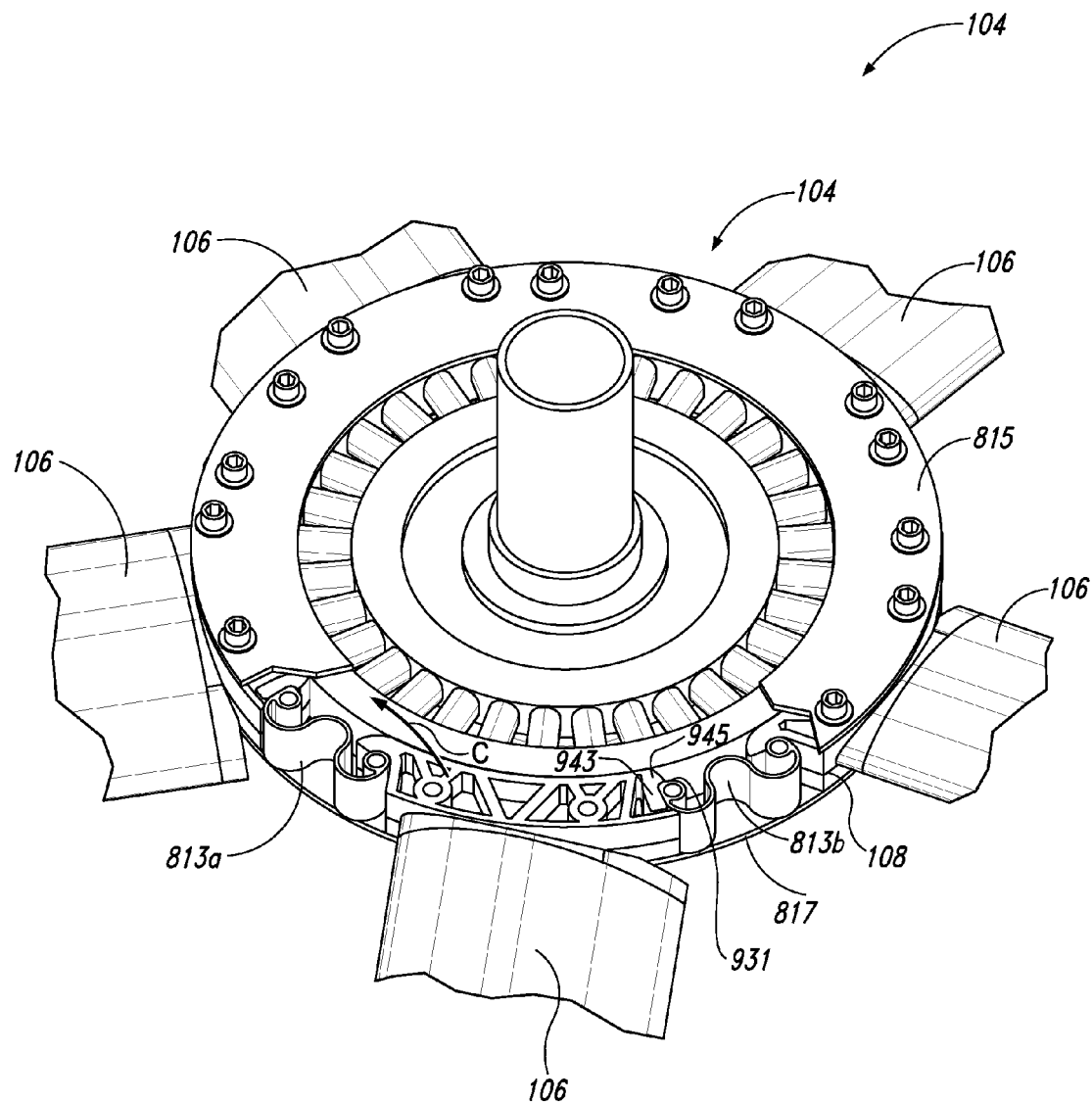
Figure 12D:
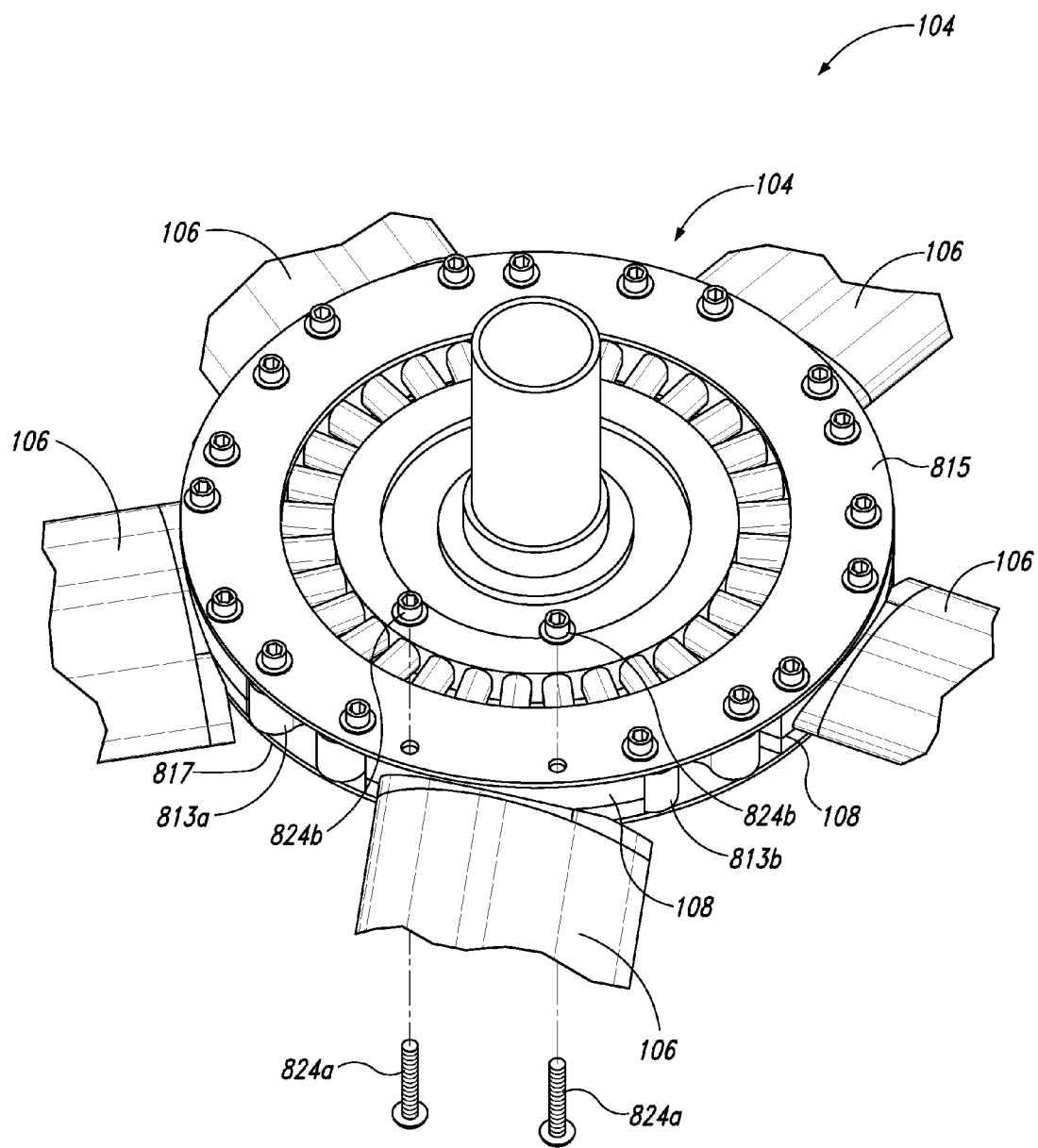

FIG. 12C shows the fan blade 106 in a third stage of installation. At this stage, the installer has pivoted the blade 106 from the orientation shown in FIG. 12B to an orientation in which the mounting bracket 108 has moved further into the space between the spacers 813*a, b*, and such that the release tab 943 contacts the second spacer 813*b*. While continuing to push the hook 937 against the pivot surface 929, the installer can apply additional pivot force, as shown by arrow C, to deflect the inner lip 945 of the release tab 943 away from and then into engagement with the catch 923*b* of the second spacer 813*b*, thereby securing the blade mount 108 between the spacers 813*a, b* in a fixed position and preventing the blade mount 108 from readily disengaging from the hub 104. With the mounting bracket 108 holding the blade 106 in the fixed position, the installer can next proceed to install the corresponding fasteners 824*a* and locking features 824*b*, as shown in FIG. 12D. In one aspect of this embodiment, the blade mount 108 can facilitate installation by bearing at least some of the weight of the fan blade 106 as the installer installs the fasteners and locking features.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A fan blade tip configured to attach to an end portion of a fan blade, wherein the fan blade tip comprises:
    an internal support structure comprising a first material having a first density; and
    a shaped body comprising a second material encasing the internal support structure and defining an exterior surface of the fan blade tip, wherein the second material has a second density that is less than the first density, wherein the internal support structure includes a base member and a plurality of elongate support elements projecting outwardly therefrom, wherein the elongate support elements are encased in the second material, and wherein the base member is configured to attach to the end portion of the fan blade.

2. The fan blade tip of claim 1 wherein the elongate support elements project in a first direction, and wherein the base member includes at least one insert portion extending in a second direction generally opposite the first direction and configured to insert into a cavity in the fan blade.

3. The fan blade tip of claim 1 wherein the second material defines the shape of an outer edge of the fan blade tip, and wherein the elongate support elements project toward the outer edge at individual distances configured to complement the shape of the outer edge.

4. The fan blade tip of claim 1 wherein the second material defines a planform of the fan blade tip, and wherein each of the elongate support elements has a length selected to correspond to the planform.

5. The fan blade tip of claim 1 wherein the exterior shape of the shaped body is defined solely by the second material.

6. The fan blade tip of claim 1 wherein the second material comprises a foam material.

7. A fan blade tip configured to attach to an end portion of a fan blade, wherein the fan blade tip comprises:
    an internal support structure comprising a first material having a first density; and
    a shaped body comprising a second material encasing the internal support structure and defining an exterior surface of the fan blade tip, wherein the second material has a second density that is less than the first density, wherein the internal support structure includes a plurality of cantilevered support elements projecting outwardly from the end portion of the fan blade, and wherein the cantilevered support elements are encased in the second material.

8. The fan blade tip of claim 7 wherein the internal support structure further includes a base member, wherein the plurality of cantilevered support elements project outwardly from the base member, wherein each of the cantilevered support elements includes an exterior surface, and wherein the second material encapsulates and adheres to the entire exterior surface of each of the cantilevered support elements.

9. The fan blade tip of claim 7 wherein the cantilevered support elements are staggered in length.

10. The fan blade tip of claim 7 wherein the second material comprises a foam material.

11. A fan blade tip configured to attach to an end portion of a fan blade, wherein the fan blade tip comprises:
    an internal support structure comprising a first material having a first density; and
    a shaped body comprising a second material encasing the internal support structure and defining an exterior surface of the fan blade tip, wherein the second material has a second density that is less than the first density, wherein the second material forms an airfoil having an inboard chord and an outboard chord, wherein the inboard chord has a first chord length, wherein the outboard chord has a second chord length less than the first chord length, and wherein the second material decreases in thickness from the inboard chord to the outboard chord.

12. The fan blade tip of claim 11 wherein the second material comprises a foam material.

13. The fan blade tip of claim 11 wherein the second material comprises synthetic foam rubber.

14. The fan blade tip of claim 11 wherein the first density is in the range of from about 20 pounds per cubic foot (pcf) to about 60 pcf, and wherein the second density is in the range of from about 1 pcf to about 20 pcf.

15. The fan blade tip of claim 14 wherein the first material comprises acrylonitrile butadiene styrene (ABS), and the second material comprises polyeurethane foam.

16. A fan blade configured to attach to a central hub of a fan, the fan blade comprising:
    a main airfoil having an outboard end portion; and
    a blade tip, including—
        an internal support structure projecting outwardly from the outboard end portion, wherein the internal support structure includes a plurality of cantilevered support elements, and a shaped body formed over the plurality of cantilevered support elements and defining an exterior surface of the blade tip, wherein the internal support structure comprises a molded plastic, and the shaped body comprises a foam material encasing the molded plastic.

17. The fan blade of claim 16 wherein the internal support structure includes at least one insert portion configured to insert into the main airfoil.

18. A fan blade configured to attach to a central hub of a fan, the fan blade comprising:
   a main airfoil having an outboard end portion; and
   a blade tip, including—
      an internal support structure projecting outwardly from the outboard end portion, wherein the internal support structure includes a plurality of cantilevered support elements, and
      a shaped body formed over the plurality of cantilevered support elements and defining an exterior surface of the blade tip, wherein the shaped body has a planform shape of the blade tip, and wherein the cantilevered support elements are staggered in length such that they complement the planform shape.

19. The fan blade of claim 18 wherein the internal support structure comprises a first material, and the shaped body portion comprises a second material that is different than the first material.

20. The fan blade of claim 18 wherein the main airfoil includes an outer wall and an internal web separating a leading edge cavity from a trailing edge cavity, wherein internal support structure further includes a first insert portion configured to insert into the leading edge cavity, and a second insert portion configured to insert into the trailing edge cavity.

21. The fan blade of claim 20 wherein internal support structure further includes an abutment feature, wherein the first and second insert portions project from the abutment feature in a first direction, and wherein the cantilevered support elements project from the abutment feature in a second direction generally opposite the first direction.

22. A fan comprising a plurality of blades extending outwardly from a central hub configured to be suspended from a ceiling or other elevated structure, wherein each of the blades includes:
   a main airfoil having an inboard end portion disposed toward the central hub and an outboard end portion spaced apart from the central hub; and
   a blade tip attached to the outboard end portion of the main airfoil, wherein the blade lip includes—
      an internal support structure, and
      means for defining an exterior surface of the blade tip and its overall shape, wherein the means for defining encapsulates the internal support structure, and wherein the internal support structure includes a plurality of coplanar, elongate support elements that extend at least partially into the means for defining.

23. The fan of claim 22, wherein the internal support structure further includes an integral base member having one or more insert portions that insert into the outboard end portion of the main airfoil.

24. The fan of claim 22 wherein the means for defining is bonded to the internal support structure.

25. The fan of claim 22 wherein the means for defining includes a foam material that encases the internal support structure.

26. A method of manufacturing a fan blade tip having an exterior surface, the method comprising:
   positioning a support structure in a mold having a mold surface that defines the exterior surface of the blade tip, wherein the support structure includes a base member and a plurality of integral support elements projecting outwardly therefrom;
   flowing uncured body material into the mold and over the integral support elements, but not the base member; and
   allowing the body material to cure.

27. The method of claim 26 wherein the body material comprises synthetic foam rubber.

* * * * *